US011741415B2

(12) United States Patent
Granholm et al.

(10) Patent No.: US 11,741,415 B2
(45) **Date of Patent: *Aug. 29, 2023**

(54) SYSTEM AND METHOD FOR PROVIDING A USER INTERFACE FOR KPI CUSTOMIZATION IN AN ANALYTIC APPLICATIONS ENVIRONMENT

(71) Applicant: Oracle International Corporation, Redwood Shores, CA (US)

(72) Inventors: David Granholm, Bloomington, MN (US); Rajesh Balu, Bangalore (IN); Ananth Venkata, San Ramon, CA (US); John Fuller, Chicago, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/476,246

(22) Filed: Sep. 15, 2021

(65) Prior Publication Data

US 2022/0101237 A1 Mar. 31, 2022

Related U.S. Application Data

(60) Provisional application No. 63/083,320, filed on Sep. 25, 2020.

(51) Int. Cl.

*G06Q 10/0639* (2023.01)
*G06F 11/34* (2006.01)

(Continued)

(52) U.S. Cl.

CPC ... *G06Q 10/06393* (2013.01); *G06F 11/3409* (2013.01); *G06F 16/2343* (2019.01);

(Continued)

(58) Field of Classification Search

None

See application file for complete search history.

(56) References Cited

U.S. PATENT DOCUMENTS 9,294,361 B1 * 3/2016 Choudhary ....... G06F 16/90335
9,911,094 B1 3/2018 Chen (Continued)

FOREIGN PATENT DOCUMENTS

EP 2112626 A1 * 10/2009 ............ G06Q 10/06

OTHER PUBLICATIONS

David et al. (Unsupervised Technique for Automatic Selection of Performance indicators in Self-Organizing Networks), Oct. 2017, IEEE Communications letters, vol. 21, No. 10 (Year: 2017).*

(Continued)

*Primary Examiner* — Romain Jeanty

(74) *Attorney, Agent, or Firm* — Tucker Ellis LLP

(57) ABSTRACT

In accordance with an embodiment, described herein is a system and method for providing key performance indicator (KPI) customization in an analytic applications environment, which enables data analytics within the context of an organization's enterprise software application or data environment, or a software-as-a-service or other type of cloud or computing environment. The system supports customization derived from multiple layers which, in aggregate, can yield a customized performance metric or KPI object. In accordance with an embodiment, the system supports a user interface with icons that describe original (e.g., out-of-the-box or factory) KPIs and user-modified KPIs. When a user modifies an original KPI object to create a customized KPI, its icon is changed to visibly indicate that the user has modified the KPI. The customized KPI can be used within KPI decks, cards, dashboards, or other types of visualizations; while retaining a lineage to the original KPI object.

15 Claims, 22 Drawing Sheets

(51) Int. Cl.
*G06F 16/23* (2019.01)
*G06F 16/26* (2019.01)

(52) U.S. Cl.
CPC ...... *G06F 16/2358* (2019.01); *G06F 16/2365* (2019.01); *G06F 16/26* (2019.01)

(56) References Cited

U.S. PATENT DOCUMENTS

| | | | | |
|---|---|---|---|---|
| 10,628,771 | B1 * | 4/2020 | Sicilia | G06Q 10/06393 |
| 10,776,719 | B2 * | 9/2020 | Maheshwari | G06N 20/00 |
| 11,120,364 | B1 * | 9/2021 | Gokalp | G06N 20/00 |
| 11,296,955 | B1 | 4/2022 | Fletcher | |
| 2009/0063221 | A1 * | 3/2009 | Jonath | G06Q 10/06<br>705/7.39 |
| 2015/0112700 | A1 | 4/2015 | Sublett | |
| 2020/0019822 | A1 | 1/2020 | Kothandaraman | |
| 2022/0100729 | A1 | 3/2022 | Granholm | |

OTHER PUBLICATIONS

Walter "The Power Of Key Performance Indicators For Sales Teams", Sep. 2014, Business, pp. 1-6 (Year: 2014).*

United States Patent and Trademark Office, Office Communication dated Oct. 31, 2022 for U.S. Appl. No. 17/476,242, 16 pages.

European Patent Office, International Searching Authority, International Search Report and Written Opinion dated Dec. 8, 2021 for International Application No. PCT/US2021/051585 , 13 pages.

European Patent Office, International Searching Authority, International Search Report and Written Opinion dated Dec. 13, 2021 for International Application No. PCT/U.S. Pat. No. 20217051587 11 pages.

United States Patent and Trademark Office, Notice of Allowance and Fee(s) Due dated Apr. 13, 2023 for U.S. Appl. No. 17/476,242 , 5 pages.

* cited by examiner

```
{
      "subjectareas":[...],
      "selectedColumns":[
      {
      "name":"sa-___-Country-___-Location-___-WorkforceManagement-WorkerAssignmentRealTime",
      "expression":"\"Workforce Management\".\"Location\".\"Country\"",
      "subjectArea":"\"Workforce Management\""
      },
      {
      "name":"sa-___-Region2-___-Location-___-WorkforceManagement-WorkerAssignmentRealTime",
      "expression":"\"Workforce Management\".\"Location\".\"Region 2\"",
      "subjectArea":"\"Workforce Management\""
      }
      ],
      "basemetrics":[
      {
            "name":"calcnode-0",
            "displayName":"Average Span of Control",
            "numberFormat":{
            }
      }
      ],
      "dimensions":[
            {
            "name":"sa-___-Country-___-Location-___-WorkforceManagement-WorkerAssignmentRealTime",
            "displayName":"Country",
            "isVizDimension":true
            },
            {
            "name":"sa-___-Region2-___-Location-___-WorkforceManagement-WorkerAssignmentRealTime",
            "displayName":"Region 2",
            "isVizDimension":true
            }
      ]
}
```

FIGURE 5

```
{
        "selectedColumns":[
        {
        "name":"sa-__-City-__-Location-__-WorkforceManagement-WorkerAssignmentRealTime",
        "expression":"\"Workforce Management\".\"Location\".\"City\"",
        "subjectArea":"\"Workforce Management\"",
                            "operation" : "add"
        }
        ],
        "dimensions":[
        {
        "name":"sa-__-City-__-Location-__-WorkforceManagement-WorkerAssignmentRealTime",
        "displayName":"City",
        "isVizDimension":true,
        "operation" : "add"
                }
        ]
}
```

*FIGURE 7*

```
--factory KPIs without any customization
SELECT A.ID, A.METADATA f_metadata, NULL c_metadata_site, 'FACTORY' source
FROM CXO_MDW_KPI A
WHERE <A.acl filters>
AND NOT EXISTS IN CXO_MDS_KPI_C
UNION ALL

--fully customized KPIs
SELECT B.ID, NULL f_metadata, B.METADATA c_metadata_site, 'CUSTOM' source
FROM CXO_MDS_KPI_C B
WHERE <B.acl filters>
AND B.STRIPE_ID = '<stripeid>'
AND B.LAYER_ID = NULL
UNION ALL

--factory customized KPIs
SELECT A.ID, A.METADATA f_metadata, B.METADATA c_metadata_site, 'FACTORYCUSTOM' source
FROM CXO_MDS_KPI A
LEFT OUTER JOIN CXO_MDS_KPI_C B ON A.ID = B.ID AND <B.acl filtes> AND B.LAYER_ID= 'SITE' AND
B.STRIPE_ID = '<stripeid>'
WHERE B.ID IS NOT NULL
```

FIGURE 9

```
{
  "source": "FACTORYCUSTOM",
     "metadata": {
        "displayname": {
           "value": xyz
  },
  "subjectareas": [...],
  "selectedColumns": [...],
  "calculatedColumns": [...],
  "basemetrics": [...],
  "detailmetrics": [...],
  "filters": [...],
  "searchtags": [...],
  "dimensions": [
  {
     "name": "sa-___-Country-___-Location-___-WorkforceManagement-WorkerAssignmentRealTime",
     "displayName": "Country",
     "isVizDimension": true
  },
  {
     "name": "sa-___-Region2-___-Location-___-WorkforceManagement-  WorkerAssignmentRealTime",
     "displayName": "Region 2",
     "isVizDimension": true
  },
  {
     "name": "sa-___-City-___-Location-___-WorkforceManagement-WorkerAssignmentRealTime",
     "displayName": "City",
     "isVizDimension": true,
     "source": "FACTORYCUSTOM"
  }
  ],
  "targets": [ ],
  "navigationTargets": [ ]
  }
}
```

FIGURE 10

User Interface 330

User Interface 330

User Interface 330

User Interface 330

User Interface 330

User Interface 330

User Interface 330

User Interface 330

User Interface 330

User Interface 330

SYSTEM AND METHOD FOR PROVIDING A USER INTERFACE FOR KPI CUSTOMIZATION IN AN ANALYTIC APPLICATIONS ENVIRONMENT

CLAIM OF PRIORITY

This application claims the benefit of priority to U.S. Provisional Patent Application titled "SYSTEM AND METHOD FOR KPI CUSTOMIZATION IN AN ANALYTIC APPLICATIONS ENVIRONMENT", Application No. 63/083,320, filed Sep. 25, 2020; and is related to U.S. Patent Application titled "SYSTEM AND METHOD FOR CUSTOMIZATION IN AN ANALYTIC APPLICATIONS ENVIRONMENT", application Ser. No. 16/868,081, filed May 6, 2020, and published as U.S. Patent Application Publication No. 20200356575; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence data, and are particularly related to a system and method for providing key performance indicator (KPI) customization in an analytic applications environment.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud or computing environment.

Some analytic environments support the use of dashboards, key performance indicators (KPIs), or other types of reports. However, different customers of a data analytics environment may have different preferences with regard to how their data is classified, aggregated, or transformed, for purposes of providing such KPIs or other business intelligence data.

SUMMARY

In accordance with an embodiment, described herein is a system and method for providing key performance indicator (KPI) customization in an analytic applications environment, which enables data analytics within the context of an organization's enterprise software application or data environment, or a software-as-a-service or other type of cloud or computing environment. The system supports customization derived from multiple layers which, in aggregate, can yield a customized performance metric or KPI object.

In accordance with an embodiment, the system supports a user interface with icons that describe original (e.g., out-of-the-box or factory) KPIs and user-modified KPIs. When a user modifies an original KPI object to create a customized KPI, its icon is changed to visibly indicate that the user has modified the KPI. The customized KPI can be used within KPI decks, cards, dashboards, or other types of visualizations; while retaining a lineage to the original KPI object.

BRIEF DESCRIPTION OF THE DRAWINGS

FIG. 5 illustrates an example metadata in accordance with an embodiment.

FIG. 7 illustrates another example metadata in accordance with an embodiment.

FIG. 9 illustrates an example set of operations for reading data associated with KPI's, in accordance with an embodiment.

FIG. 10 illustrates an example merged JSON file in accordance with an embodiment.

DETAILED DESCRIPTION

Figure 1:
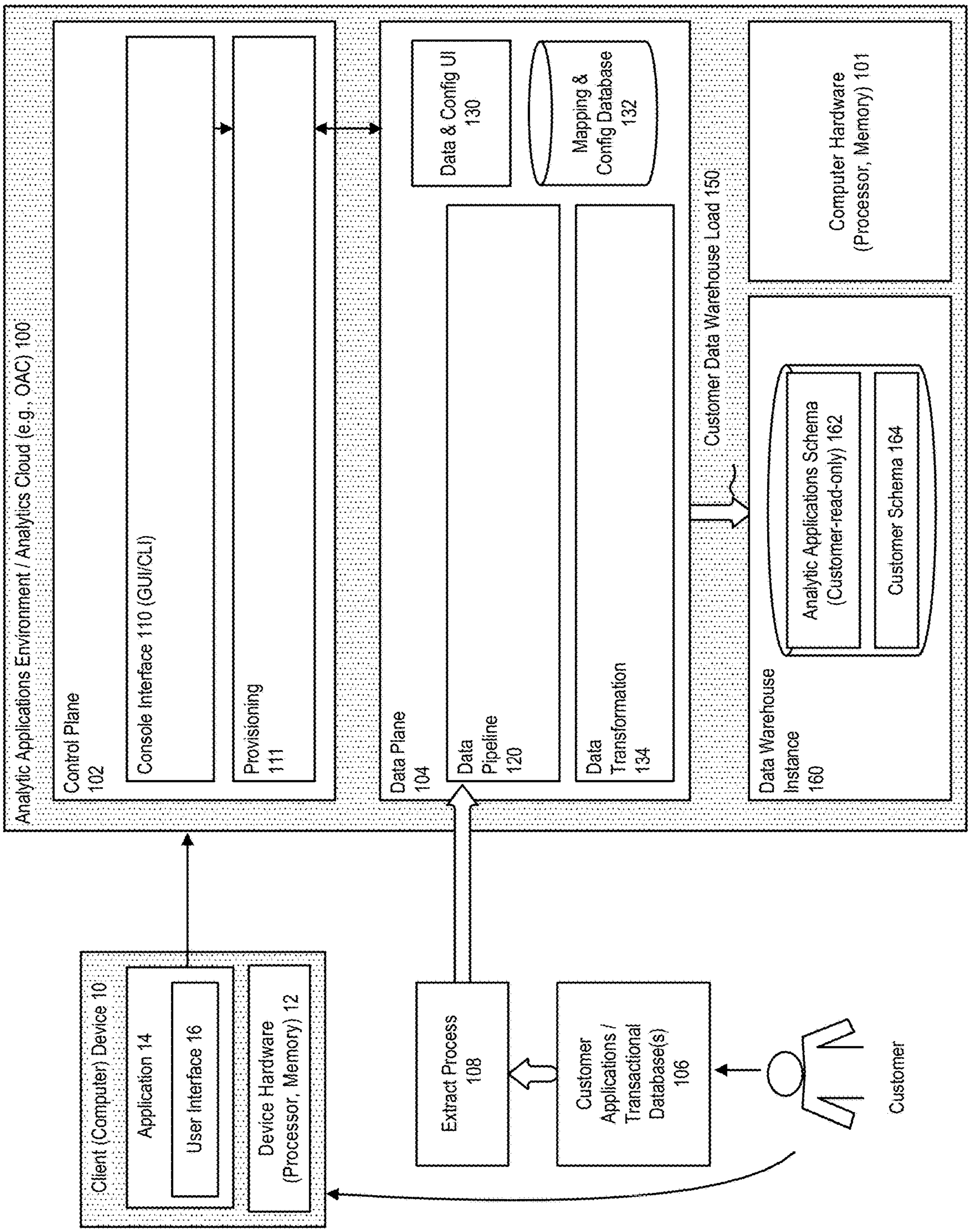
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud or computing environment.

In accordance with an embodiment, described herein is a system and method for providing key performance indicator (KPI) customization in an analytic applications environment, which enables data analytics within the context of an organization's enterprise software application or data environment, or a software-as-a-service or other type of cloud or computing environment. The system supports customization derived from multiple layers which, in aggregate, can yield a customized performance metric or KPI object.

In accordance with an embodiment, the system enables creation of a customized KPI, by layering variations of the KPI information on an original (e.g., out-of-the-box or factory) KPI object which are merged at runtime to create the final customized KPI. Each delta-KPI can itself also support multiple, e.g., site/user levels/layers. The approach can be used to provide extensibility for user interface decks/dashboards on which KPI visualization objects, such as decks, cards, dashboards, or other types of visualizations, appear.

In accordance with an embodiment, the system supports customization derived from multiple layers which, in aggregate, can yield a customized performance metric or KPI object that does not modify the underlying or original (e.g., out-of-the-box or factory) version of that KPI object; and allows for upgrades, reversions and tracking of changes in the KPI editor or user interface.

In accordance with an embodiment, customers can move data, create key performance indicators (KPIs), and present them as decks, cards, dashboards, or other types of visualizations. On occasion, a customer may want to customize and extend those KPIs for use with their particular business; which traditionally would require a save-as approach, to create a new KPI; however then the lineage back to the original KPI would be lost. By layering variations of KPI information on an original (e.g., out-of-the-box or factory) KPI object, the feature is particularly useful in, for example, multi-tenant environments, wherein a tenant can layer changes to a base KPI plus a tenant-specific or user-specific delta-KPI, which are merged at runtime to create the final customized KPI.

In accordance with an embodiment, the system supports a user interface with icons that describe original (e.g., out-of-the-box or factory) KPIs and user-modified KPIs. When a user modifies an original KPI object to create a customized KPI, its icon is changed to visibly indicate that the user has modified the KPI. The customized KPI can be used within KPI decks, cards, dashboards, or other types of visualizations; while retaining a lineage to the original KPI object.

In accordance with an embodiment, at any stage, the user can revert back to that out-of-the-box or factory KPI. The customized KPI's lineage to the original KPI also allows it to be patched or otherwise updated when that original KPI is updated.

In accordance with various embodiments, technical advantages of the described approach include, for example: (1) optimization of storage required for creating and using KPI's, as in many cases only modest tweaks are needed to an out-of-the-box or factory KPI object; and (2) supportability and ease of upgrade of underlying factory KPI definitions across subsequent releases.

Analytic Applications Environment

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities.

For example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

In accordance with an embodiment, an analytic applications environment can be provided in association with an analytics cloud environment (analytics cloud), such as, for example, an Oracle Analytics Cloud (OAC) environment. Such an environment provides a scalable and secure public cloud service that provides capabilities to explore and perform collaborative analytics.

FIG. 1 illustrates a system for providing an analytic applications environment, in accordance with an embodiment.

The example shown and described in FIG. 1 is provided for purposes of illustrating an example of one type of data analytics environment that can utilize the various embodiments of KPI customization as described herein. In accordance with other embodiments and examples, the KPI customization features that are described herein can be used with other types of data analytics environments.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud or computing environment. For example, in accordance with an embodiment, the control plane can include a console interface 110 that enables access by a client computer device 10 having a device hardware 12, application 14, and user interface 16, under control of a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse. In accordance with an embodiment, the data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

In accordance with an embodiment, an illustrative example of an analytic applications environment which can utilize the various systems, methods, and features described herein is illustrated in U.S. Patent Application titled "SYSTEM AND METHOD FOR CUSTOMIZATION IN AN ANALYTIC APPLICATIONS ENVIRONMENT", application Ser. No. 16/868,081, filed May 6, 2020, and published as U.S. Patent Application Publication No. 20200356575, which applications is herein incorporated by reference. In accordance with various embodiments, the systems and methods described herein can be used with other types of enterprise software application or data environments, cloud environments, cloud services, cloud computing, or other analytic applications or computing environments.

Extensibility and Customization

Different customers of a data analytics environment may have different requirements with regard to how their data is classified, aggregated, or transformed, for purposes of providing data analytics or business intelligence data, or developing software analytic applications.

In accordance with an embodiment, to support such different requirements, the system can include a semantic layer that enables the use of custom semantic extensions to extend a semantic data model (semantic model), and provide custom content at a presentation layer. Extension wizards or development environments can guide users in using the custom semantic extensions to extend or customize the semantic model, through a definition of branches and steps, followed by promotion of the extended or customized semantic model to a production environment.

Figure 2:
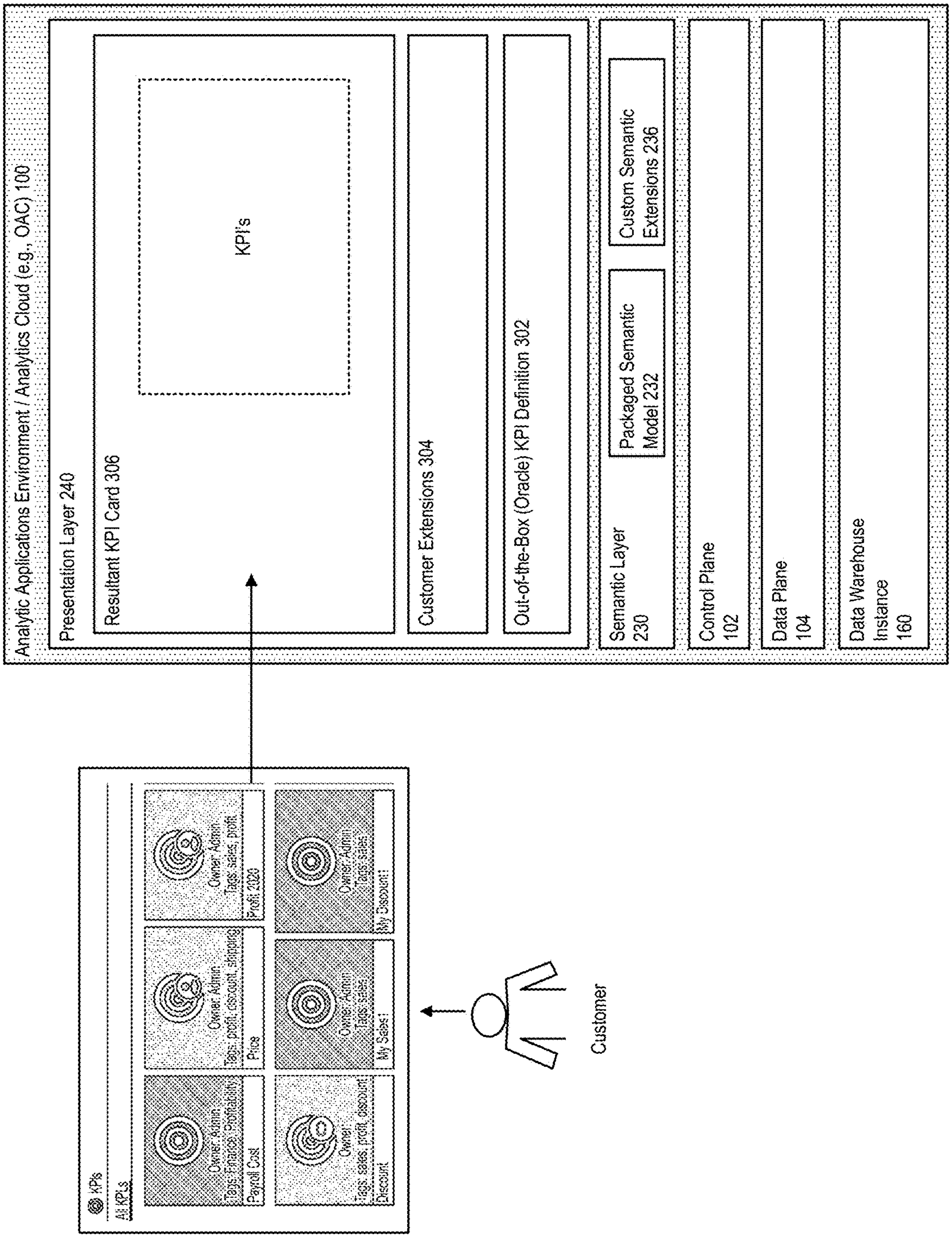
FIG. 2 illustrates a system for supporting extensibility and customization in an analytic applications environment, in accordance with an embodiment.

FIG. 2 illustrates a system for supporting extensibility and customization in an analytic applications environment, in accordance with an embodiment.

In accordance with an embodiment, a semantic layer can include data defining a semantic model of a customer's data; which is useful in assisting users in understanding and accessing that data using commonly-understood business terms.

As illustrated in FIG. 2, in accordance with an embodiment, the semantic layer 230 can include a packaged (out-of-the-box, initial) semantic model 232 that can be used to provide a packaged content. For example, the system can use an ETL or other data pipeline or process as described above, to load data from a customer's enterprise software application or data environment into a data warehouse instance, wherein the packaged semantic model can then be used to provide packaged content to the presentation layer.

In accordance with an embodiment, the semantic layer can also be associated with one or more semantic extensions 236 that can be used to extend the packaged semantic model, and provide custom content to the presentation layer 240.

In accordance with an embodiment, the presentation layer can enable access to the data content using, for example, a software analytic application, user interface, dashboard, key performance indicators (KPI's) 242; or other type of report or interface as may be provided by products such as, for example, Oracle Analytics Cloud, or Oracle Analytics for Applications.

For example, as described below, in accordance with an embodiment, customized KPI's can be created by a combination or merging of extensions at various levels, including an original, factory, or out-of-the box KPI definition 302, and customer extensions 304, to create a resultant or customized KPI card 306.

In accordance with an embodiment, in addition to data sourced from a customer's environment using the ETL or other data pipelines or processes described above; customer data can be loaded to a data warehouse instance using a variety of data models or scenarios that provide opportunities for further extensibility and customization.

Layered KPI Customization

In accordance with an embodiment, the system supports customization derived from multiple layers which, in aggregate, can yield a customized performance metric or KPI object that does not modify the underlying or original (e.g., out-of-the-box or factory) version of that KPI object; and allows for upgrades, reversions and tracking of changes in the KPI editor or user interface.

In accordance with an embodiment, customers can move data, create key performance indicators (KPIs), and present them as decks, cards, dashboards, or other types of visualizations. On occasion, a customer may want to customize and extend those KPIs for use with their particular business; which traditionally would require a save-as approach, to create a new KPI; however then the lineage back to the original KPI would be lost. By layering variations of KPI information on an original (e.g., out-of-the-box or factory) KPI object, the feature is particularly useful in, for example, multi-tenant environments, wherein a tenant can layer changes to a base KPI plus a tenant-specific or user-specific delta-KPI, which are merged at runtime to create the final customized KPI.

Figure 3:
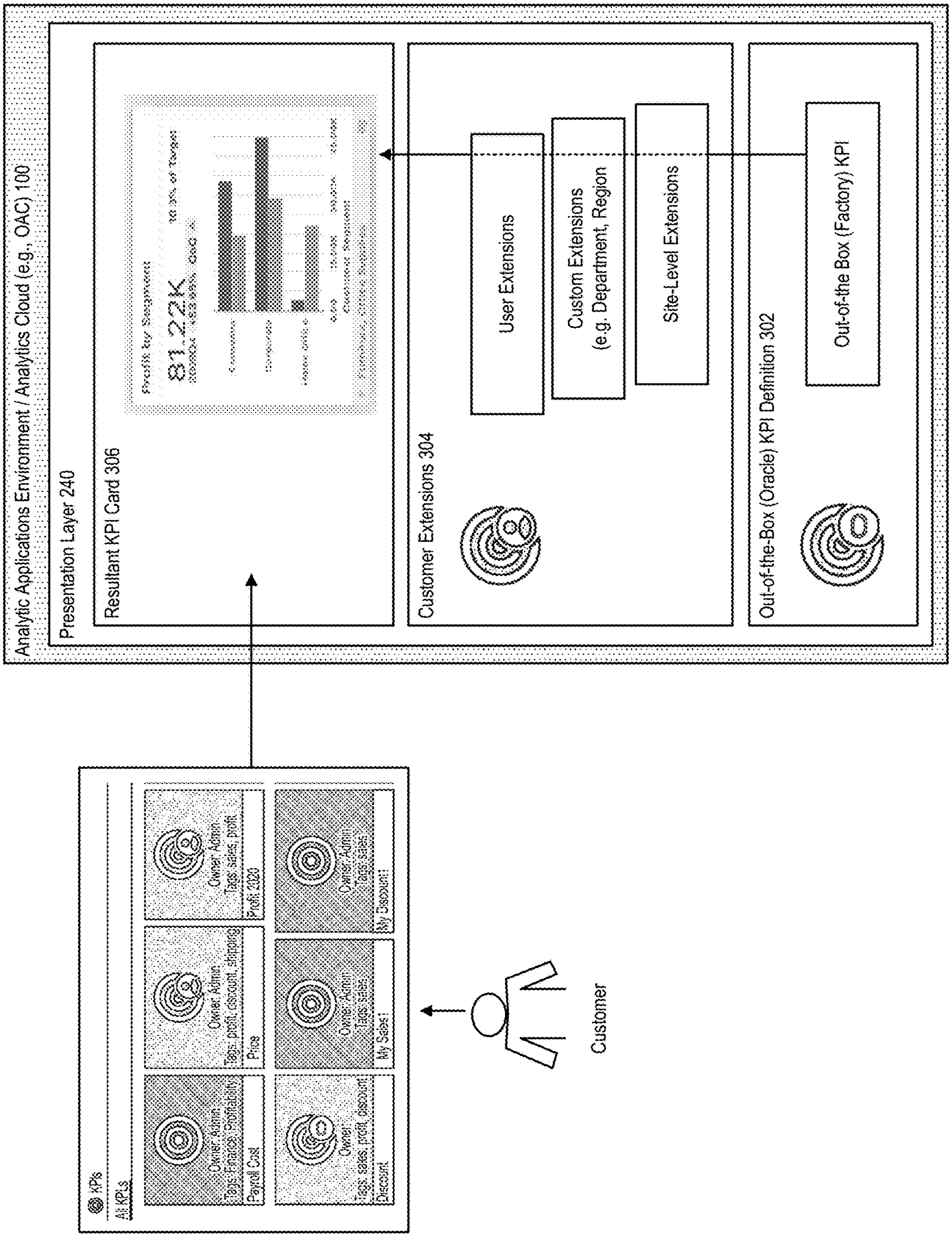
FIG. 3 illustrates how the system can be used to provide KPI customization in accordance with an embodiment.

FIG. 3 illustrates how the system can be used to provide KPI customization in accordance with an embodiment, in which a KPI definition can be merged with extensions to provide a customized KPI.

As described above, in accordance with an embodiment, in an analytic applications environment, a presentation layer can enable access to data content using, for example, a software analytic application, user interface, dashboard, key performance indicators (KPI's); or other type of report or interface as may be provided by products such as, for example, Oracle Analytics Cloud, or Oracle Analytics for Applications. In such environments, KPI customizations allow customers to leverage the same underlying factory KPIs that, e.g., Oracle experts provide as part of Fusion Applications, or Fusion Applications Warehouse (FAW).

As illustrated in FIG. 3, in accordance with an embodiment, the approach follows a multi-leveled or multi-layered approach to KPI customization which, in aggregate, will yield a customized KPI that does not touch the, e.g., underlying Oracle version. This allows for upgrades, reversions and tracking of changes in, for example, a KPI editor or other user interface.

Layered Customization Data Model

In accordance with an embodiment, the system provides a separation between an original (e.g., out-of-the-box or factory) version of a KPI object, and customized KPI objects, at the data model level.

For example, in accordance with an embodiment, a CXO_MDS_KPI table can be provided to contain out-of-the-box or factory versions of plurality of KPI objects. In such an example, a CXO_MDS_KPI_C table can then be provided to contain customizations to one or more those KPI objects, for example as a fully-customized KPI object, or as customizations to the out-of-the-box or factory versions of the KPI objects.

In accordance with an embodiment, a customer's data can be accessed by means of a base table that contains KPI objects which are shipped out-of-the-box (i.e., from the factory or system provider). This table can be provided a read-only copy, wherein there will be no inserts or update or deletes to this table by the application code. Those KPI objects that are developed in-factory will be imported into this table, for example, during system (pod) provisioning. The base table is not striped by tenant, so there is only one copy of the factory metadata for the entire system (pod), and the table is not duplicated for each tenant.

In accordance with an embodiment, when a user creates a new KPI object, or customizes an original (e.g., out-of-the-box or factory) version of a KPI object, the system will save this addition/customization in a custom table.

For example, in a multi-tenant analytic applications environment, a first tenant may create a first set of changes to an out-of-the-box or factory version of a KPI object, and those first set of changes are stored as a first delta-KPI. A second tenant may create a different/second set of changes to the out-of-the-box or factory version of the KPI object, and those second set of changes are stored as a different/second delta-KPI.

In accordance with an embodiment, the system does not modify the original (e.g., out-of-the-box or factory) version of the KPI object, nor copy that object into the tenant's stored data space—since it would be duplicative and would restrict the ability of the system to tie customized KPIs, based on the delta-KPIs, back to their original out-of-the-box or factory KPI object.

In accordance with an embodiment, the custom table is striped, and each customer's customizations are stored in separate stripes. In the case of a new KPI object, the entire metadata can be saved into the custom table. In the case of customizations of a factory KPI object, the delta-KPI metadata can be saved into the custom table.

In accordance with an embodiment, the customized KPI can be stored, for example, in a JSON format, an example which is described below, which can then be used to render a visualization of the KPI in a user interface.

In accordance with an embodiment, each KPI can be associated with an ID that indicates the particular KPI, a namespace, a metadata, and an access control list (ACL) ID.

For example, the ID can be provided as a numeric value; and the namespace can indicate the source of the KPI object or the delta-KPI object. The metadata can indicate, for example as illustrated in Example Metadata 1 below, a definition of various dimensions, expressions, or other information associated with the customer data that will be queried to provide the resultant KPI visualization. The ACL ID can be used to provide an indication of the security required to access the KPI.

Example Illustration for KPI Customization Scenarios

In accordance with an embodiment, various examples of different KPI customization scenarios are illustrated below.

Figure 4:
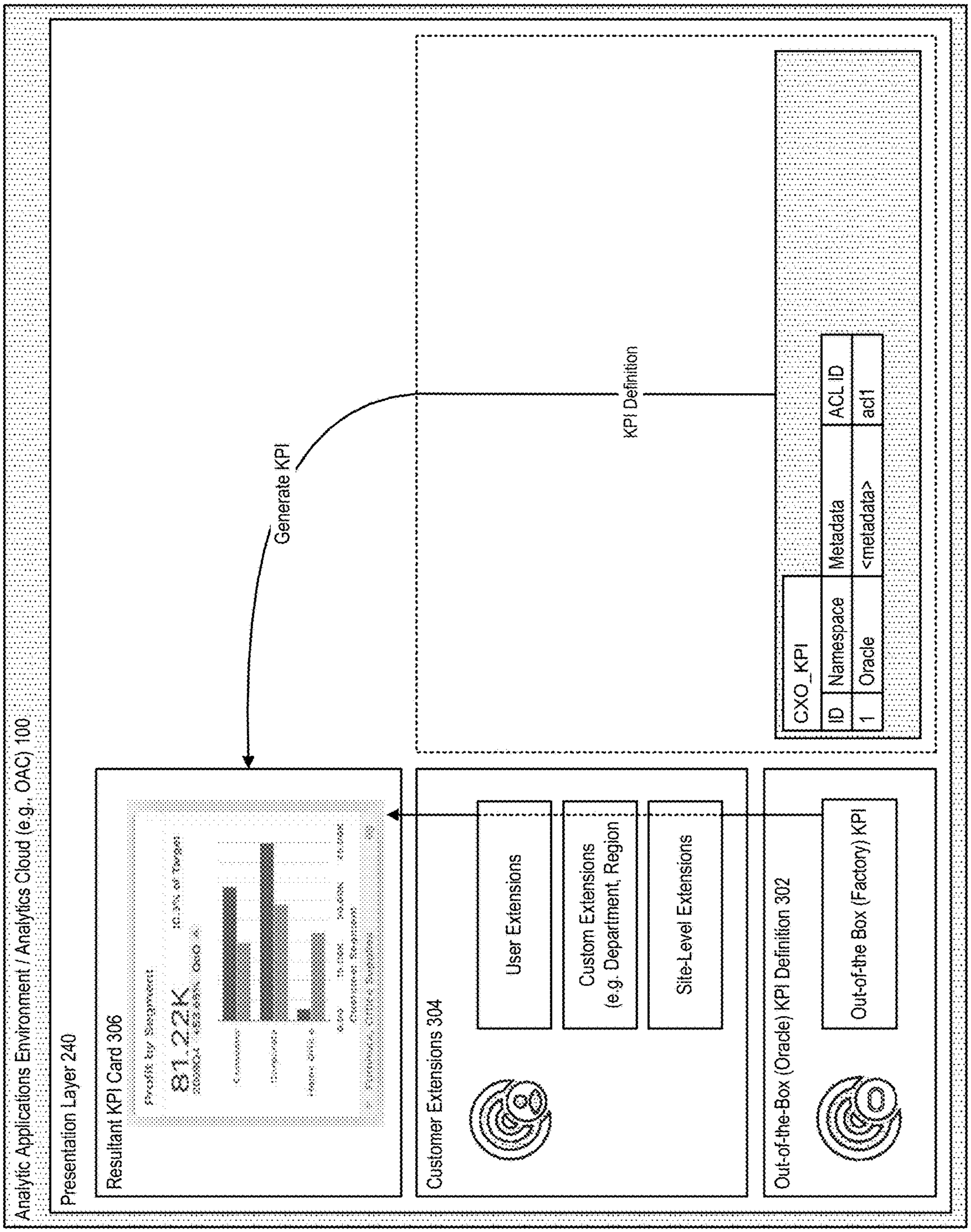
FIG. 4 illustrates an example KPI customization in accordance with an embodiment.

FIG. 4 illustrates an example KPI customization in accordance with an embodiment, in which a KPI definition can be merged with extensions to provide a customized KPI. As illustrated in FIG. 4 and partially reproduced below, in this example an original (e.g., out-of-the-box or factory) version of the KPI object is not customized:

| CXO_KPI | | | |
|---|---|---|---|
| ID | Namespace | Metadata | ACL ID |
| 1 | Oracle | <metadata> | acl1 |

Example (Original) KPI 1

In this example, the out-of-the-box or factory version of the KPI object can be used, as described above, to access a customer data and produce a KPI deck, card, dashboard, or other type of visualization based on that data.

FIG. 5 illustrates an example metadata in accordance with an embodiment, which illustrates a KPI definition associated with out-of-the-box or factory version of the KPI object. As illustrated in FIG. 5 and reproduced below, in this example, the KPI provides a workforce information including country locations and regions, for use in generating a KPI.

```
{
    “subjectareas”:[...],
    “selectedColumns”:[
    {
    “name”:“sa-__-Country-__-Location-__-WorkforceManagement-
            WorkerAssignmentRealTime”,
    “expression”:“\“Workforce Management\”.\“Location\”.\“Country\””,
    “subjectArea”:“\“Workforce Management\””
    },
    {
    “name”:“sa-__-Region2-__-Location-__-WorkforceManagement-
        WorkerAssignmentRealTime”,
    “expression”:“\“Workforce Management\”.\“Location\”.\“Region 2\””,
    “subjectArea”:“\“Workforce Management\””
    }
    ],
    “basemetrics”:[
    {
    “name”:“calcnode-0”,
    “displayName”:“Average Span of Control”,
    “numberFormat”:{
    }
}
],
    “dimensions”:[
    {
    “name”:“sa-__-Country-__-Location-__-WorkforceManagement-
        WorkerAssignmentRealTime”,
    “displayName”:“Country”,
    “isVizDimension”:true
    },
{
    “name”:“sa-__-Region2-__-Location-__-WorkforceManagement-
        WorkerAssignmentRealTime”,
    “displayName”:“Region 2”,
    “isVizDimension”:true
    }
    ]
}
```

Example Metadata 1

In this example, the metadata can be used to access a customer data and produce a KPI deck, card, dashboard, or other type of visualization based on that data, including information based on country or regions dimensions (although in this example, not based on a city dimension).

KPI Customization-Addition of New Dimension

Figure 6:
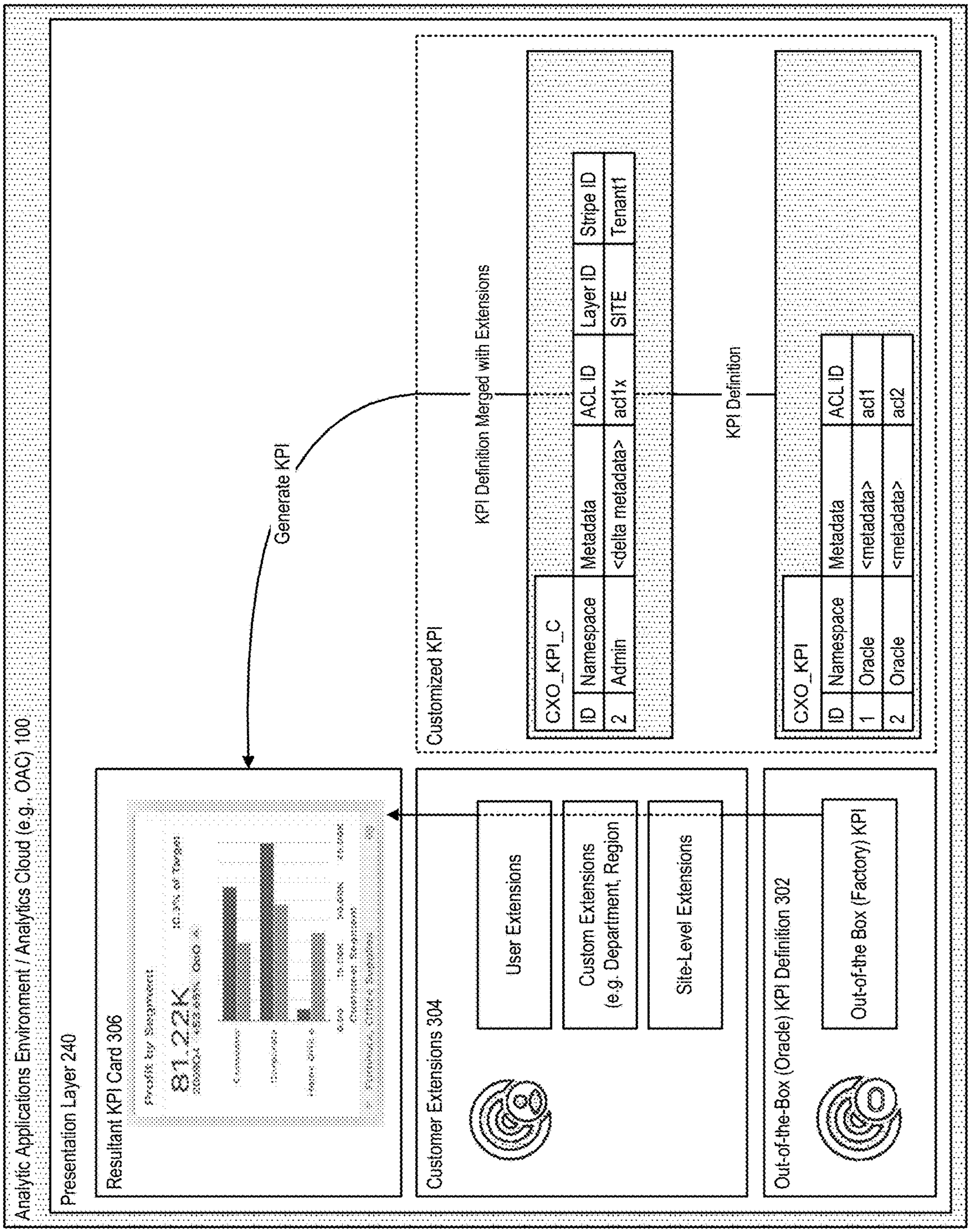
FIG. 6 further illustrates an example KPI customization in accordance with an embodiment.

FIG. 6 further illustrates an example KPI customization in accordance with an embodiment, in which a KPI definition can be merged with extensions to provide a customized KPI. As illustrated in FIG. 6 and partially reproduced below, in this example an out-of-the-box or factory version of the KPI object is customized, for example, wherein a new dimension is added to the KPI:

| CXO_KPI_C | | | | | |
|---|---|---|---|---|---|
| ID | Namespace | Metadata | ACL ID | Layer ID | Stripe ID |
| 2 | Admin | <delta metadata> | acl1x | SITE | Tenant1 |

| CXO_KPI | | | |
|---|---|---|---|
| ID | Namespace | Metadata | ACL ID |
| 1 | Oracle | <metadata> | acl1 |
| 2 | Oracle | <metadata> | acl1 |

Example (Customized) KPI 2

In this example, the modifications to the original (e.g., out-of-the-box or factory) version of the KPI object, i.e., the delta-KPI, includes a <delta metadata> and a layer ID and stripe ID, which can be used to support layered KPI customization, and customizations associated with different tenants.

For example, in accordance with an embodiment, the layer ID can be used as a site identifier, to indicate site-layer customizations. In another example, the layer ID can be used as a department identifier, to indicate department-layer customizations. Other types of layer IDs can be used, for example to indicate user layers, or other levels of customizations.

As described herein, in accordance with an embodiment, the multi-level or multi-layer approach or design to KPI customization can be extended to include any number of additional layers of customization. For example, the layer ID can be used to indicate any layer that is meaningful to the customer, for example corporate enterprise regions (e.g., USA, Europe), departments (e.g., HR, Finance), or particular users or groups of users.

In accordance with an embodiment, the stripe ID can be used to indicate a tenant, for example in a cloud or multi-tenant environment. This enables a particular table for use in such an environment to be shared by multiple tenants.

In accordance with an embodiment, the ACL for a delta-KPI can be configured differently from that associated with the underlying KPI, This allows, for example, different departments to use different ACLs, and the KPIs will be returned appropriately depending on the ACL attributes of the, e.g., department or the user accessing that customized KPI.

FIG. 7 illustrates another example metadata in accordance with an embodiment, which illustrates a KPI definition associated with out-of-the-box or factory version of the KPI object.

As illustrated in FIG. 7 and reproduced below, in this example that uses a delta-KPI definition associated with the out-of-the-box or factory version of the KPI object, the user has added a dimension for city. The KPI will be effectively customized, so that the combined (KPI plus delta-KPI) metadata can be used to access a customer data and produce a KPI deck, card, dashboard, or other type of visualization based on that data, including in this example information based on country, regions, and/or the city dimensions added by the delta-KPI customization.

```
{
   “selectedColumns”:[
   {
   “name”:“sa-__-City-__-Location-__-WorkforceManagement-
        WorkerAssignmentRealTime”,
   “expression”:“\“Workforce Management\”.\“Location\”.\“City\””,
   “subjectArea”:“\“Workforce Management\””,
   “operation” : “add”
   }
```

-continued

```
   ],
   “dimensions”:[
   {
   “name”:“sa-__-City-__-Location-__-WorkforceManagement-
        WorkerAssignmentRealTime”,
   “displayName”:“City”,
   “isVizDimension”:true,
   “operation” : “add”
   }
   ]
}
```

Example Metadata 2

In this example, the original KPI metadata, provided by the out-of-the-box or factory version of the KPI object and directed to country or region, is not repeated in the delta-KPI metadata. However, when a query is made to the customer data to produce a KPI deck, card, dashboard, or other type of visualization, the system will put both the country information expressed in the original KPI metadata, and also the city information expressed in the delta-KPI metadata, in order to process the query.

Since the original out-of-the-box or factory version of the KPI object has not been modified, if any change is made to the original KPI, for example by Oracle, then the original KPI will continue to work; and to the extent the delta-KPI does not conflict with the underlying factory KPI, those delta-KPIs will likewise continue to work, and additionally can benefit from the original KPI being updated, patched or otherwise modified.

KPI Customization-Creation of New Customized KPI

Figure 8:
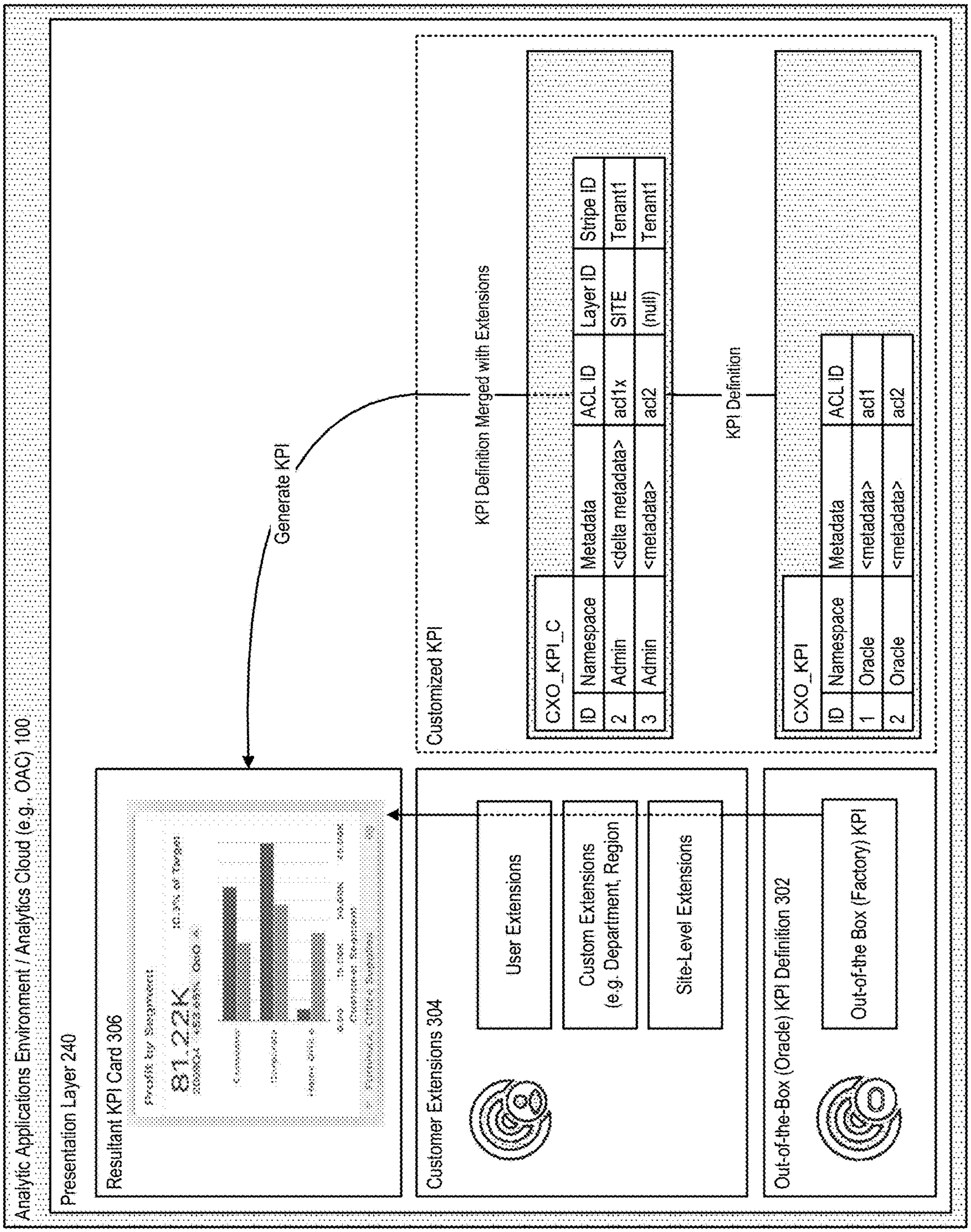
FIG. 8 further illustrates an example KPI customization in accordance with an embodiment.

FIG. 8 further illustrates an example KPI customization in accordance with an embodiment, in which a KPI definition can be merged with extensions to provide a customized KPI. As illustrated in FIG. 8 and partially reproduced below, in this example a new customized KPI is created, optionally but not necessarily beginning with the out-of-the-box or factory version of the KPI object as a starting point:

| CXO_KPI_C | | | | | |
|---|---|---|---|---|---|
| ID | Namespace | Metadata | ACL ID | Layer ID | Stripe ID |
| 2 | Admin | <delta metadata> | acl1x | SITE | Tenant1 |
| 3 | Admin | <metadata> | acl2 | (null) | Tenant1 |

| CXO_KPI | | | |
|---|---|---|---|
| ID | Namespace | Metadata | ACL ID |
| 1 | Oracle | <metadata> | acl1 |
| 2 | Oracle | <metadata> | acl1 |

Example (Customized) KPI 3

In this example, which illustrates a new customized KPI, a customer in creating a new KPI has not created a delta-KPI metadata, but instead has created a new KPI (in this example, in namespace “Admin”). In this example, the KPI ID=3 indicates that the KPI is a new customized KPI and not a delta-KPI. Additionally, in this example, the <metadata> layer is null in this instance, since again it is not a delta-KPI, but rather a new KPI customization (optionally beginning with the out-of-the-box or factory version of the KPI object as a starting point).

In this example, the KPIs are also being created for a particular tenant ("Tenant1"). Each of the delta-KPIs are created as deltas of the original (e.g., out-of-the-box or factory) version of the KPI object.

Although not illustrated above, in accordance with some embodiments, a customer/tenant could, for example, take the KPI ID 3 delta-KPI, and then create yet another/further delta-KPI, and the process could be further continued for other layers. Additional layer values and/or column types can also be used, to provide yet further layering or customizations.

For example, in accordance with an embodiment, to support user-level customization, the objects can include an additional customer, user, or other column. Alternatively, a user-level customization can be indicated with, for example, layer=USER, and layer ID-<name of user>. Similarly, the layer can be indicated as layer=CUSTOM, or some other value to indicate some other customization layer. The striped ID can be used to indicate, for example, a department (that could be associated with that user).

In accordance with an embodiment, the KPI model described above can used, for example, in association with the presentation layer of a data analytics environment, to prepare the user interface decks, cards, dashboards or other visualizations associated with a customer data and maintained within the data analytics environment.

For example, in accordance with an embodiment, the dimensions indicated by the KPI object metadata as described above can be used by the data analytics environment while accessing the database via a semantic model or semantic layer, examples of which are described above.

In accordance with other embodiments the system can, instead of accessing data via a semantic model or layer, access the data via some other model or layer, for example by accessing the data itself directly or via some other intermediate component that provides access to customer data and supports retrieval of the data according to the KPI object and/or customized KPI object.

Operation Examples

In accordance with an embodiment, at runtime when creating the visualization associated with a particular KPI, the system can examine the definition of the KPI as provided by the KPI objects (including where appropriate any delta-KPI) as described above, and use that information to generate operations, e.g., SQL SELECT operations or other commands, to retrieve the data from the database, for example using a combination of read, insert, update, or joins across such various operations. In accordance with an embodiment, various examples of READ, INSERT, UPDATE, and DELETE operations are illustrated below.

READ Operation

In accordance with an embodiment, a READ operation can retrieve data associated with KPIs from the database using a pseudo-SQL logic or other data retrieval process. In the following example, the table will include a factory KPI (not customized by a tenant, similar to the example illustrated as KPI 1 above); a fully-customized KPI (similar to the example illustrated as KPI 3 above); and a factory customized KPI (similar to the example illustrated as KPI 2 above).

FIG. 9 illustrates an example set of operations for reading data associated with KPI's, in accordance with an embodiment. As illustrated in FIG. 9 and reproduced below, in this example

```
--factory KPIs without any customization
SELECT A.ID, A.METADATA f_metadata, NULL c_metadata_site, 'FACTORY' source
FROM CXO_MDW_KPI A
WHERE <A.acl filters>
AND NOT EXISTS IN CXO_MDS_KPI_C
UNION ALL
--fully-customized KPIs
SELECT B.ID, NULL f_metadata, B.METADATA c_metadata_site, 'CUSTOM' source
FROM CXO_MDS_KPI_C B
WHERE <B.acl filters>
AND B.STRIPE_ID = '<stripeid>'
AND B.LAYER_ID = NULL
UNION ALL
--factory customized KPIs
SELECT A.ID, A.METADATA f_metadata, B.METADATA c_metadata_site,
    'FACTORYCUSTOM' source
FROM CXO_MDS_KPI A
LEFT OUTER JOIN CXO_MDS_KPI_C B ON A.ID = B.ID AND <B.acl filtes>
    AND B.LAYER_ID= 'SITE' AND B.STRIPE_ID = '<stripeid>'
WHERE B.ID IS NOT NULL
```

Example SELECT Operations

FIG. 10 illustrates an example merged JSON file in accordance with an embodiment, which contains additional properties at each KPI attribute level, to indicate which attributes are customized attributes versus factory-provided attributes. As illustrated in FIG. 10 and reproduced below, in this example

```
{
  "source": "FACTORYCUSTOM",
    "metadata": {
      "displayname": {
        "value": xyz
  },
  "subjectareas": [...],
  "selectedColumns": [...],
  "calculatedColumns": [...],
  "basemetrics": [...],
```

-continued

```
    "detailmetrics": [...],
    "filters": [...],
    "searchtags": [...],
    "dimensions": [
    {
        "name": "sa-__-Country-__-Location-__-WorkforceManagement-
            WorkerAssignmentRealTime",
        "displayName": "Country",
        "isVizDimension": true
    },
    {
        "name": "sa-__-Region2-__-Location-__-WorkforceManagement-
            WorkerAssignmentRealTime",
        "displayName": "Region 2",
        "isVizDimension": true
    },
    {
        "name": "sa-__-City-__-Location-__-WorkforceManagement-
            WorkerAssignmentRealTime",
        "displayName": "City",
        "isVizDimension": true,
        "source": "FACTORYCUSTOM"
    }
    ],
    "targets": [ ],
    "navigationTargets": [ ]
    }
}
```

Example JSON File

In accordance with an embodiment, the data returned from the database using the above process will need to be further processed before providing data to the presentation layer or user interface. For example, the KPIs in the 'FACTORYCUSTOM' set (310), the f_metadata and c_metadata_site will be compared, merged, and processed according to the supported customization use cases. Using the above example, wherein the factory model include country, but then added a city delta, the JSON will then contain all three of the dimensions specified by the out-of-the-box or factory version of the KPI object and the customized delta-KPI object.

In accordance with an embodiment, the JSON information can then be used to provide the information returned by the database to the user interface. The JSON can also indicate when the data associated with a particular KPI is being provided by, for example, an original (e.g., out-of-the-box or factory) version of a KPI object, or by a customized KPI object.

In accordance with an embodiment, such information can then be parsed by the presentation layer or user interface when rendering an indication of the KPI (including, for example, its icon as displayed in the user interface)—to illustrate whether the icon (and its associated KPI) is being determined either by a an original (e.g., out-of-the-box or factory) version of a KPI object, or by a customized KPI object (or customized delta-KPI object).

INSERT Operation

In accordance with an embodiment, for an INSERT operation: If it's a pure custom object, it just needs to be inserted into the custom table. If it's a factory object that is customized, the delta needs to be computed first, and the delta alone needs to be stored in the custom table (with appropriate layer id) with the same KPI id. No inserts will be done to the base table ever, except while importing at provisioning time.

UPDATE Operation

In accordance with an embodiment, for an UPDATE operations: No updates will be done to the base table. If it's a pure custom object, the new metadata can be simply updated in the custom table. If it's a factory object, the delta needs to be computed and updated to the custom table (at the appropriate layer).

DELETE Operation

In accordance with an embodiment, for a DELETE operation: No deletes will be done to the base table. If it's a pure custom object, the new metadata can be simply deleted in the custom table, provided ACL permits. If it's a factory object, the delta record in the custom table can be deleted (thus reverting back to the factory version of the object).

KPI Customization Error Detection

In accordance with an embodiment, the system supports error-checking in association with an errors introduced while creating a customized KPI. For example, if a customer creates a customized KPI that would negatively affect the operations of a factor KPI, then the system can flag an error messages to the user to information them of that event.

KPI Implementation Examples

In accordance with an embodiment, Table 1 illustrates various examples associated with KPI implementation.

TABLE 1

| Item | Description |
|---|---|
| Factory cards | We consider factory cards as read only cards. So even after customization of a KPI, factory cards will still continue to use the factory KPI. |
| Custom cards | Custom cards will start using the new metadata from factory-customized KPI. While creating a card, the used column references from KPI are stored in card metadata. In case of any removal of such columns from KPI while customization will fail to render the card. In this case please remove the card from the deck and add it back again using the new customized metadata. |
| Favorites from factory cards | Favorites from factory cards will still continue to use factory KPI. |
| Favorites from custom cards | Favorites from custom cards will start using the new metadata from factory-customized KPI. In case of any removal of used columns from KPI while customization will fail to render the favorite card. |
| KPI listing page | Factory KPIs will have different set menu options based on the permissions you have. Can View: View, Save As. Can Edit: Customize/Edit, Save As, Inspect. Full Control: Customize/Edit, Save As, Inspect, Reset to factory(after customization) |
| KPI Owner name | Changing the owner name in KPI should not change the existing ACL. We are giving full control of KPI to KPI owner. |

KPI Customization Use Cases

In accordance with an embodiment, Table 2 illustrates various examples of KPI customization use cases.

TABLE 2

| Attribute | Types of Customization |
| --- | --- |
| Display Name | Can be modified. |
| Description | Can be modified. |
| Tags | Factory tags can be deleted. New tags can be added |
| Owner | Owner of factory KPIs is Admin. Customer can change owner to any other user. |
| Data Sources | Factory data sources cannot be removed. New data sources can be added. |
| Calculations | Factory calculation can be edited or deleted. New calculations can be added. |
| Base Metric | Factory base metric can be delete and custom metric. Can be set as base metric. |
| Related Metrics | Factory related metrics can be deleted. New metrics can be added. |
| Dimensions/ Grouping Categories | Factory dimensions can be deleted. New dimensions can be added. |
| Targets | Factory targets can be deleted. New targets can be added |
| Filters | Factory filters can be deleted. Factory filters' values can be edited (e.g., delete some values, and add new values). New filters can be added. |
| Links/URLs | New links can be added. Rename factory links. Delete factory links |
| ACLs | Factory ACLs can be modified (full). |
| Time Levels | Factory added time levels can be deleted and new column can be added as time level. |
| Number Format Properties of Factory Metrics | Change Number format of factory metric (Base Measure/Target/ RelatedMeasure). |
| Properties of Factory Dimensions → Assign To (Card Visualization/Filters/ Filters and Visualization) | Modification allowed. |
| Properties of Factory Dimensions → Filter Name (Input field to provide UI filter name for selected dimension) | Modification allowed. |
| Threshold of Factory Targets | Change threshold values of factory target. |
| KPI Property: Pillar (CX/Finance/HCM) | Modification allowed. |
| KPI Property: Calendar Type (Fiscal/Gregorian) | Modification allowed. |
| KPI Property: Trend Goal (Increase over time/Decrease over times/Neutralize over time) | Modification allowed. |
| KPI Property: Target Goal (Stay above target/Stay below target/Hit target) | Modification allowed. |
| KPI Property: Datablending | |

Figure 11:
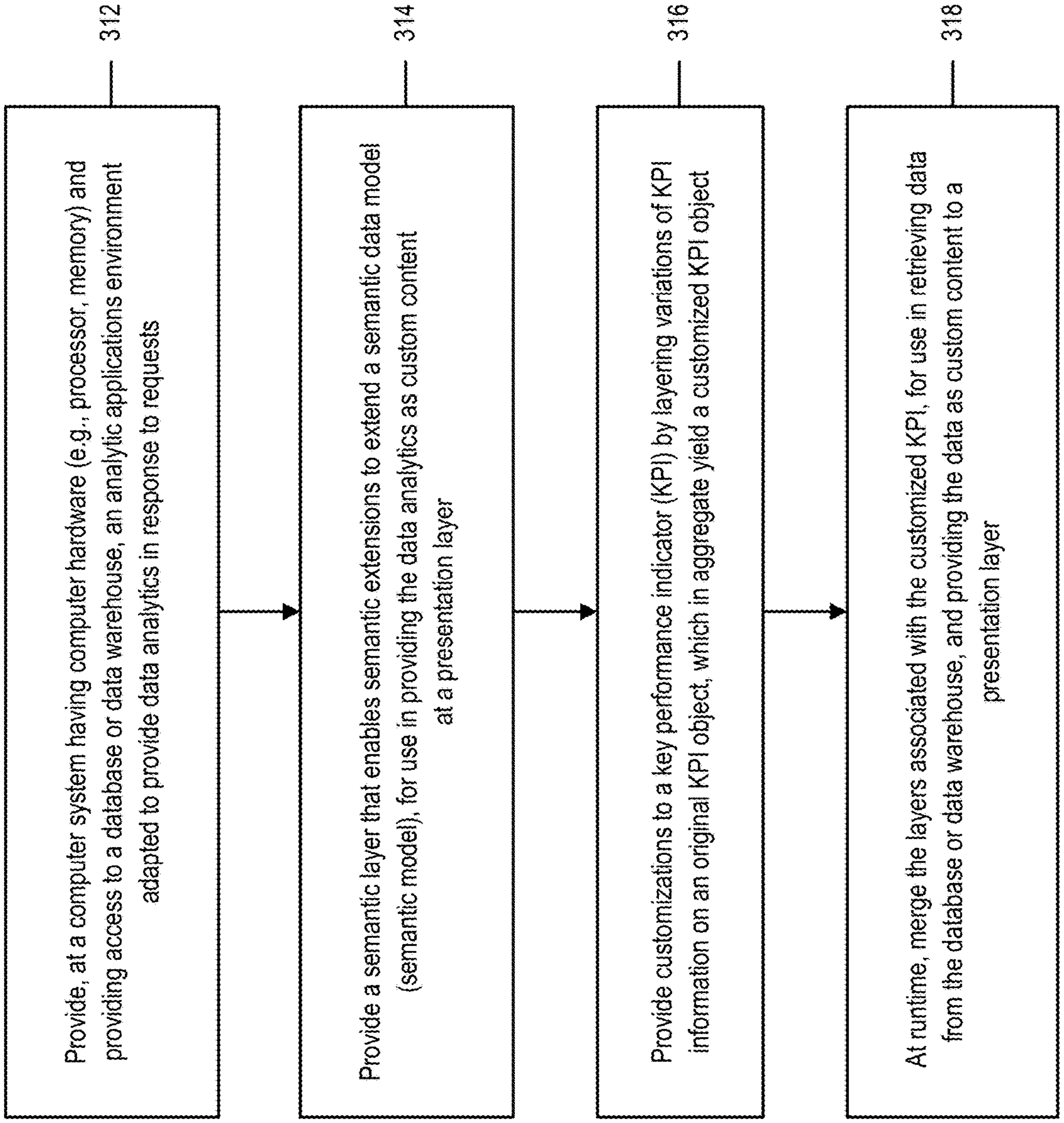
FIG. 11 illustrates a process for providing KPI customization in an analytic applications environment, in accordance with an embodiment.

FIG. 11 illustrates a process for providing KPI customization in an analytic applications environment, in accordance with an embodiment.

As illustrated in FIG. 11, in accordance with an embodiment, at step 312, a computer system having computer hardware (e.g., processor, memory) provides access to a database or data warehouse, via an analytic applications environment adapted to provide data analytics in response to requests.

At step 314, a semantic layer enables semantic extensions to extend a semantic data model (semantic model), for use in providing the data analytics as custom content at a presentation layer.

At step 316, customizations to a key performance indicator (KPI) are provided by layering variations of KPI information on an original KPI object, which in aggregate yield a customized KPI object.

At step 318, at runtime, the system merges the layers associated with the customized KPI, for use in retrieving data from the database or data warehouse, and providing the data as custom content to a presentation layer.

User Interface for KPI Customization

In accordance with an embodiment, the system supports a user interface with icons that describe original (e.g., out-of-the-box or factory) KPIs and user-modified KPIs. When a user modifies an original KPI object to create a customized KPI, its icon is changed to visibly indicate that the user has modified the KPI. The customized KPI can be used within KPI decks, cards, dashboards, or other types of visualizations; while retaining a lineage to the original KPI object.

In accordance with an embodiment, at any stage, the user can revert back to that out-of-the-box or factory KPI. The customized KPI's lineage to the original KPI also allows it to be patched or otherwise updated when that original KPI is updated.

For example, as described above, in accordance with an embodiment, the customized KPI can be stored, for example, in a JSON format, an example which is described below, which can then be used to render a visualization of the KPI in a user interface.

In accordance with an embodiment, the JSON information can then be used to provide the information returned by the database to the user interface. The JSON can also indicate when the data associated with a particular KPI is being provided by, for example, an original (e.g., out-of-the-box or factory) version of a KPI object, or by a customized KPI object.

In accordance with an embodiment, such information can then be parsed by the presentation layer or user interface when rendering an indication of the KPI (including, for example, its icon as displayed in the user interface)—to illustrate whether the icon (and its associated KPI) is being determined either by a an original (e.g., out-of-the-box or factory) version of a KPI object, or by a customized KPI object (or customized delta-KPI object).

FIGS. 12-21 illustrate various examples of user interfaces that enable a user to create and use a customized KPI, in accordance with an embodiment.

Figure 12:
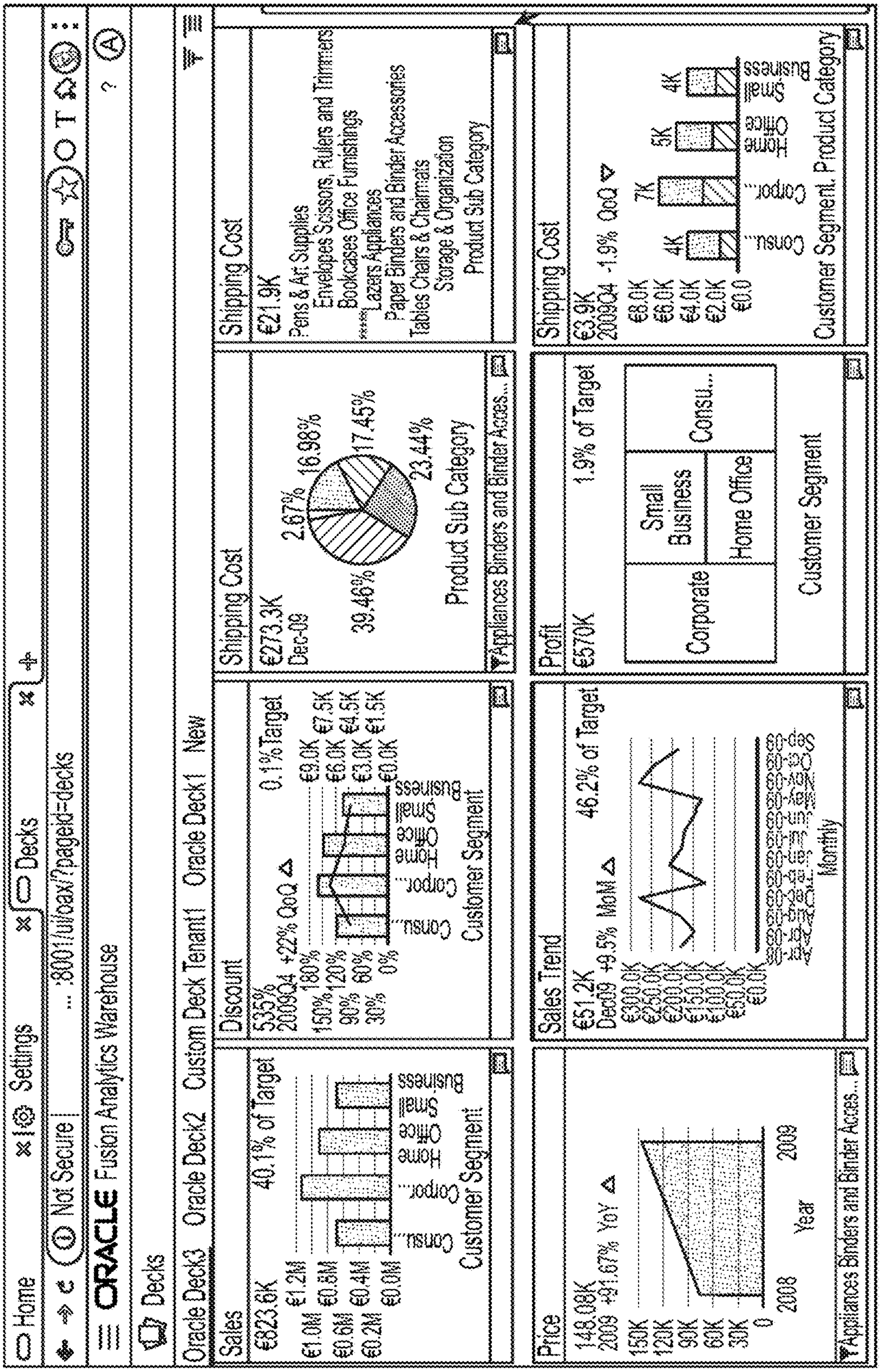
FIG. 12 illustrates an example user interface that enables a user to create and use a customized KPI, in accordance with an embodiment.
Figure 13:
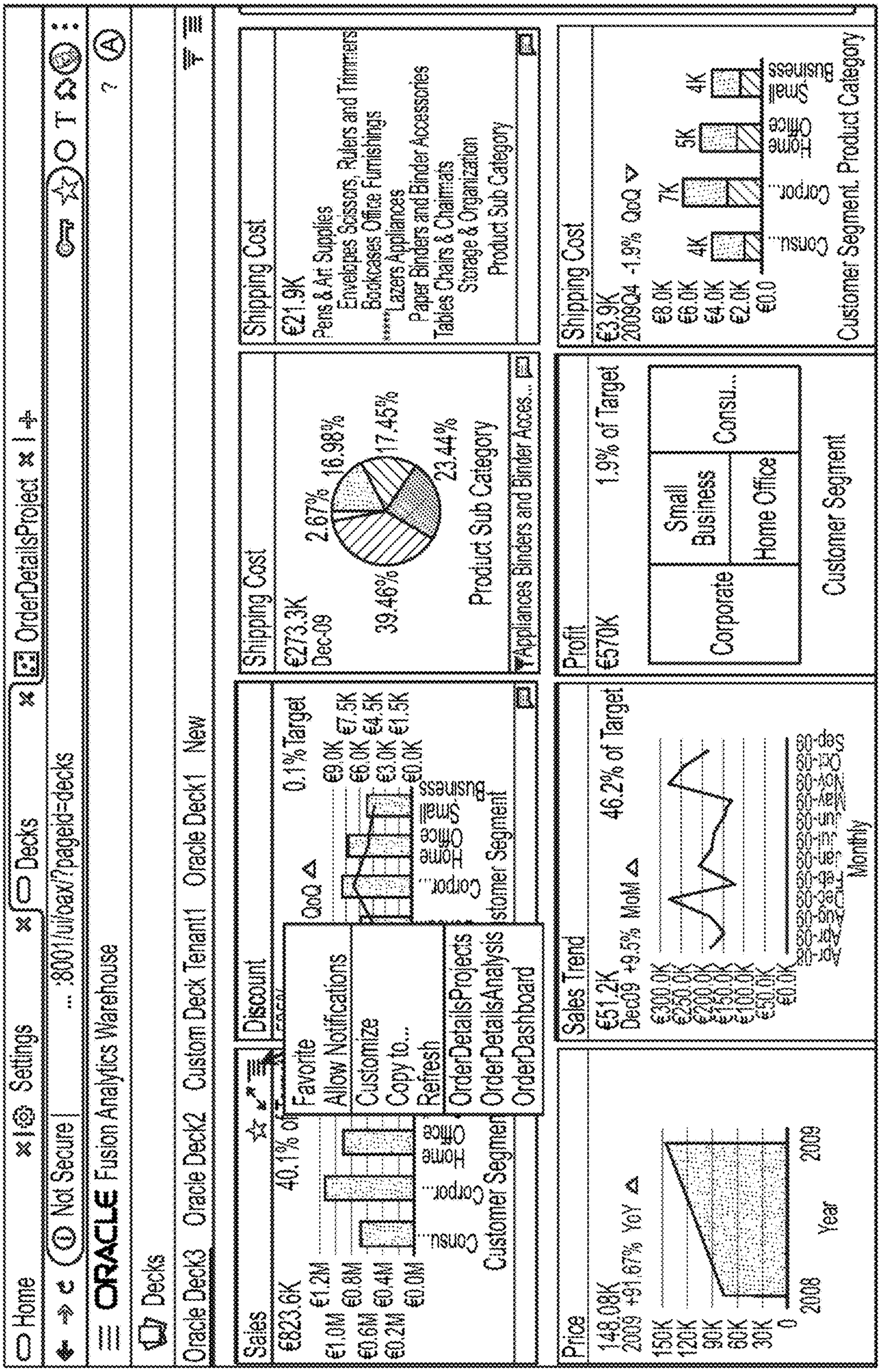
FIG. 13 illustrates an example user interface that enables a user to create and use a customized KPI, in accordance with an embodiment.

As illustrated in FIGS. 12-13, a user interface 330 allows a user to view and select various analytics decks to use; or to customize; each of which can include one or more KPIs that display values or other information within the deck.

Figure 14:
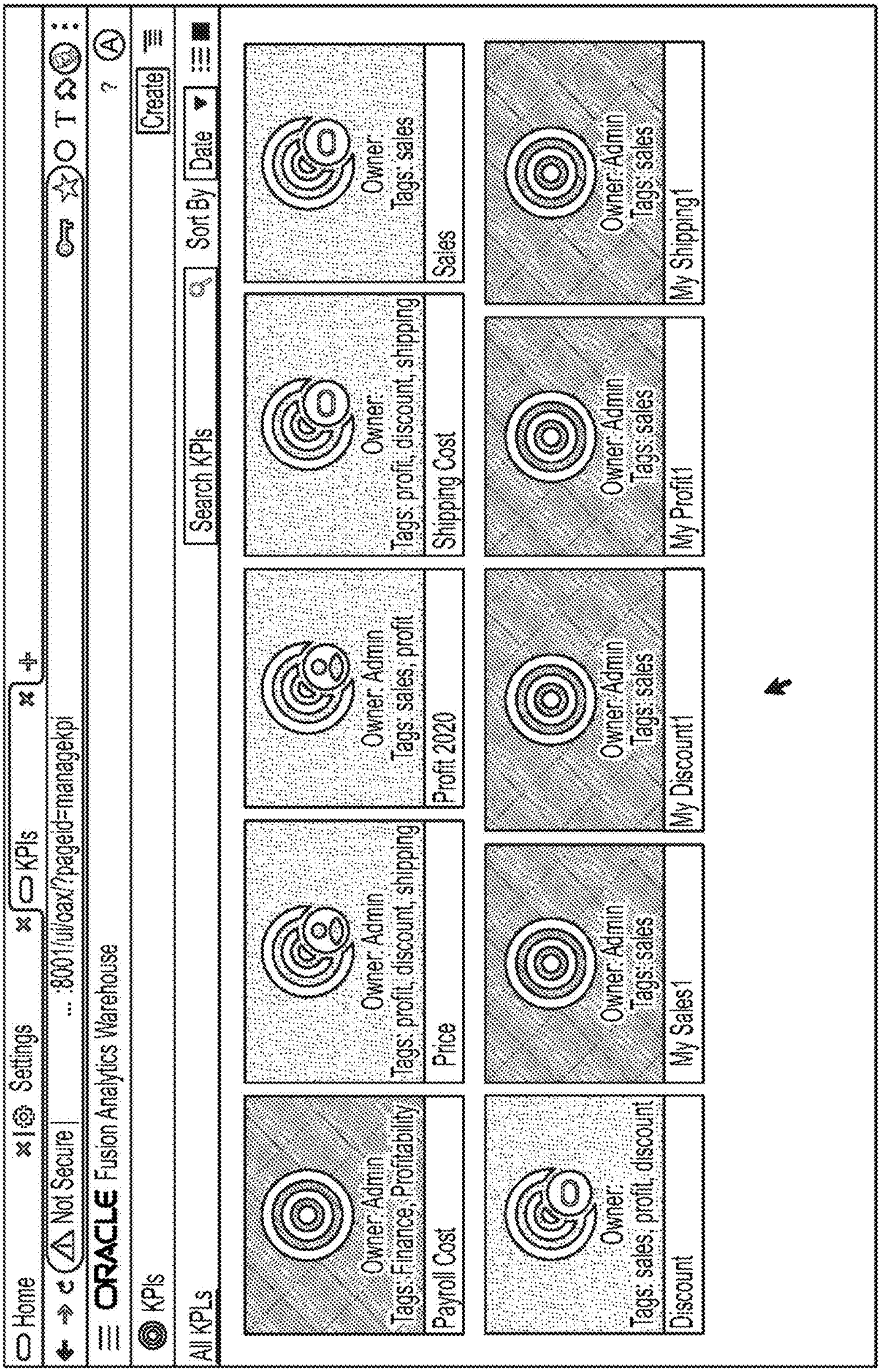
FIG. 14 illustrates an example user interface that enables a user to create and use a customized KPI, in accordance with an embodiment.
Figure 15:
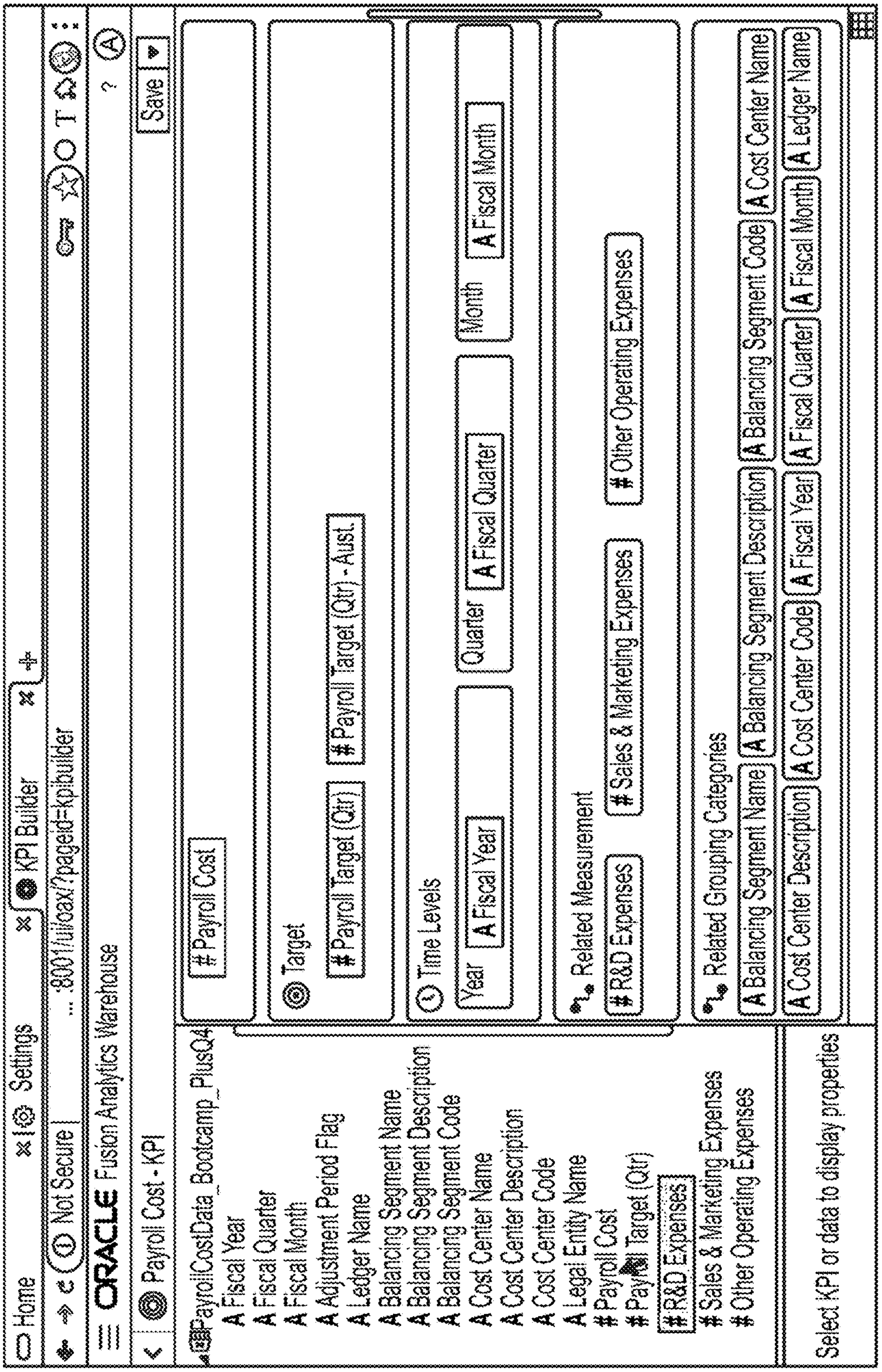
FIG. 15 illustrates an example user interface that enables a user to create and use a customized KPI, in accordance with an embodiment.
Figure 16:
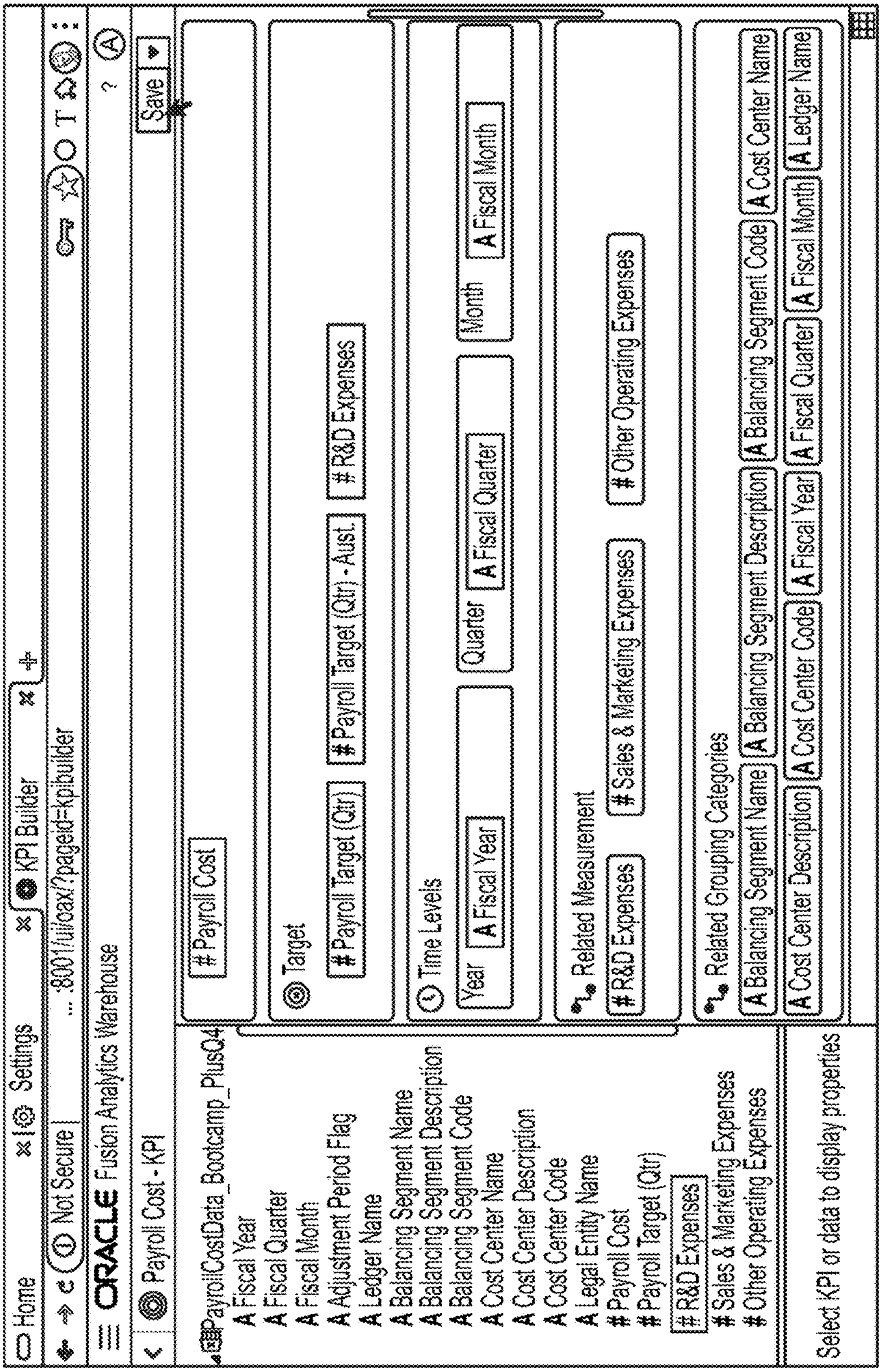
FIG. 16 illustrates an example user interface that enables a user to create and use a customized KPI, in accordance with an embodiment.
Figure 17:
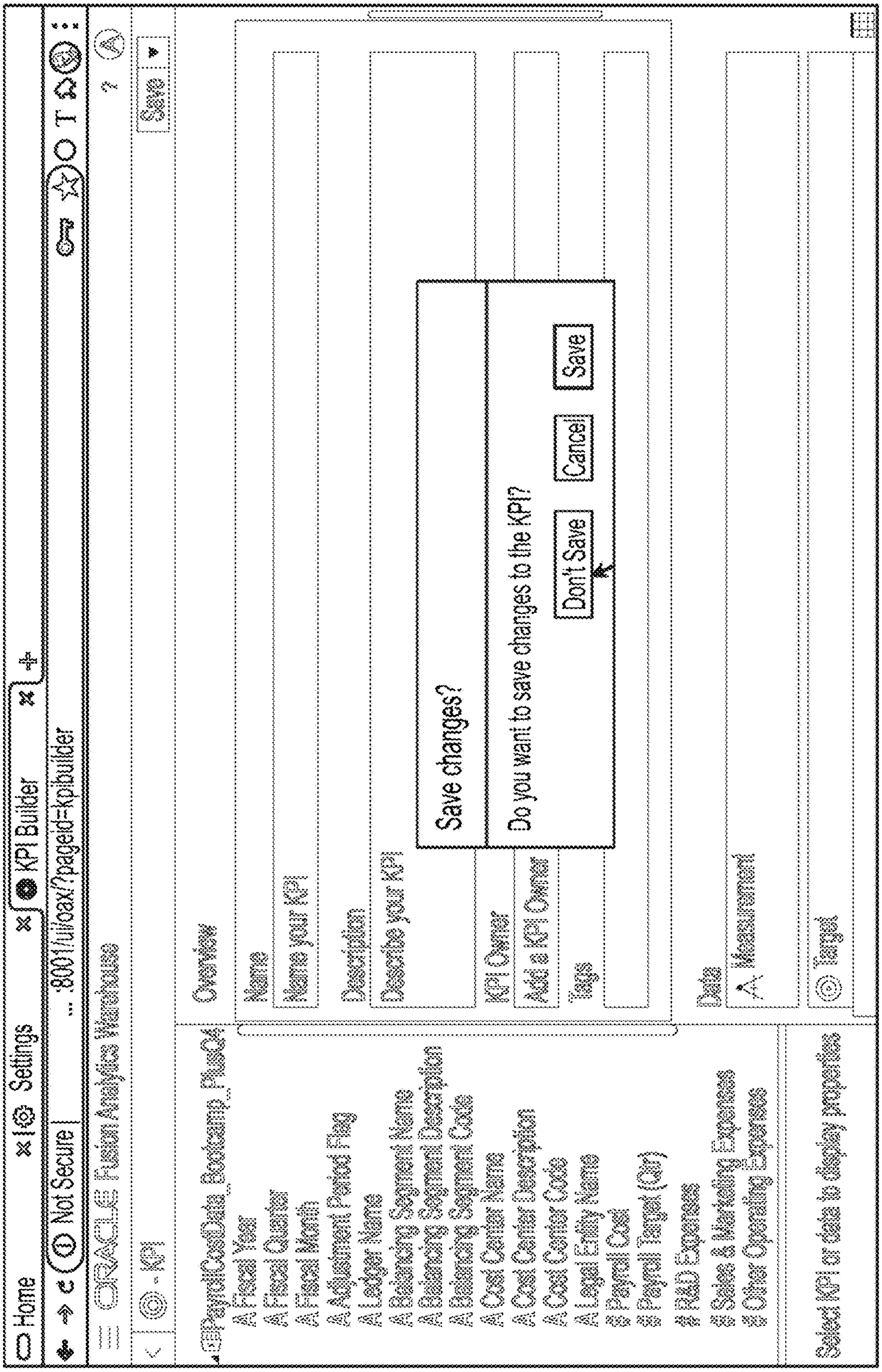
FIG. 17 illustrates an example user interface that enables a user to create and use a customized KPI, in accordance with an embodiment.
Figure 18:
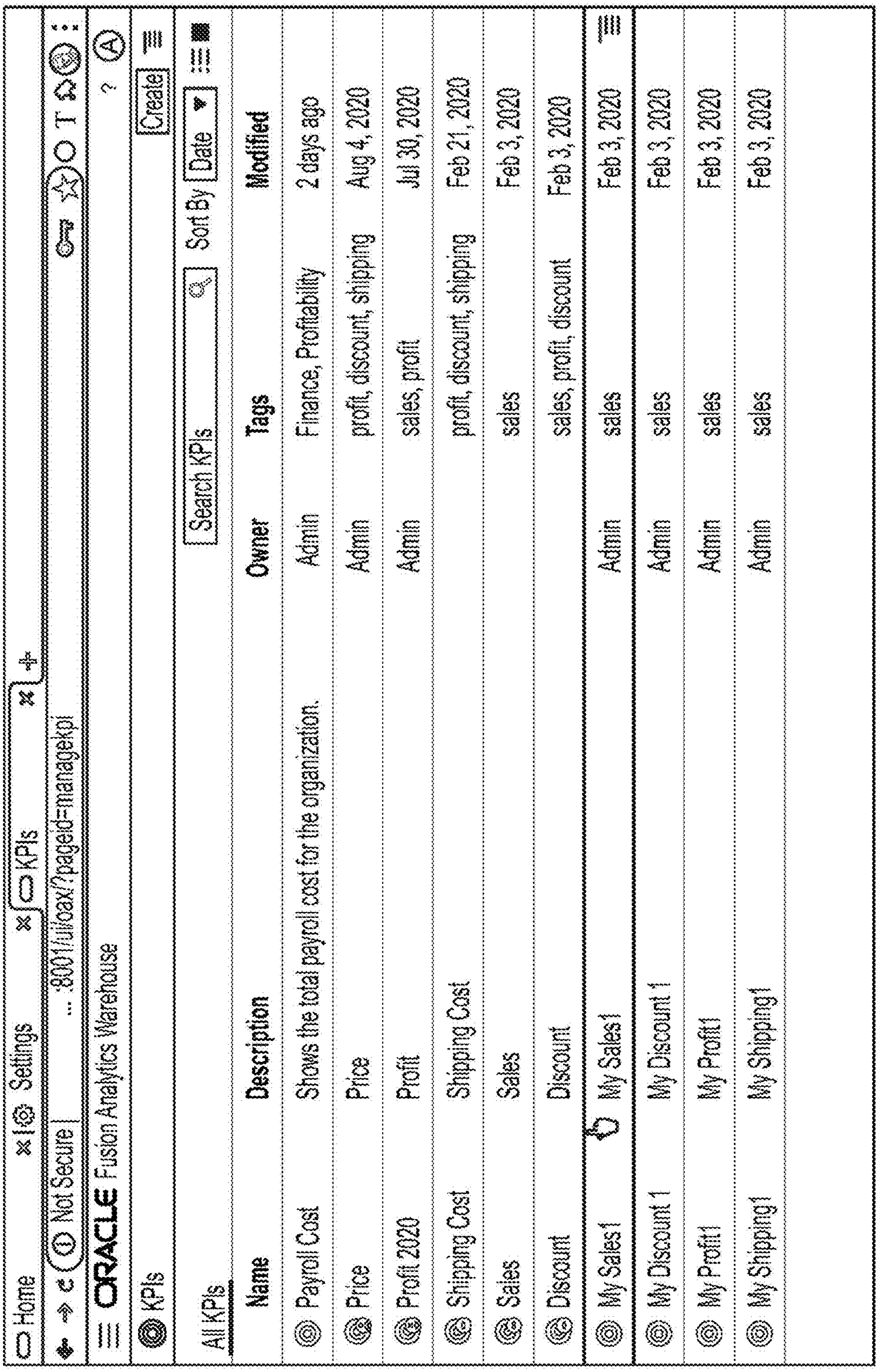
FIG. 18 illustrates an example user interface that enables a user to create and use a customized KPI, in accordance with an embodiment.

As illustrated in FIG. 14, an array of KPIs can be viewed, and particular KPIs can be selected for customization. Different icons can be provided to indicate which KPIs are provided out-of-the-box or are factory-provided; and which KPIs have been customized to suit a particular, e.g., customer site, department, or user.

For example, as illustrated in FIG. 14, the "Sales" KPI is in this example associated with a particular icon that indicates its associated KPI is an original (e.g., out-of-the-box or factory) KPI.

Depending on the particular implementation, different approaches can be used to provide a differentiation between icons that are associated with original versions of a KPI object, and icons that are associated with customized KPI objects, including for example different types of icon colors and/or different indicia or other design or ornamental features.

As illustrated in FIGS. 15-18, KPI attributes can be viewed, or modified, and the changes saved.

For example, as described above, in accordance with an embodiment, when a user creates a new KPI object, or customizes an original (e.g., out-of-the-box or factory) version of a KPI object, the system will save this addition/customization in a custom table.

Figure 19:
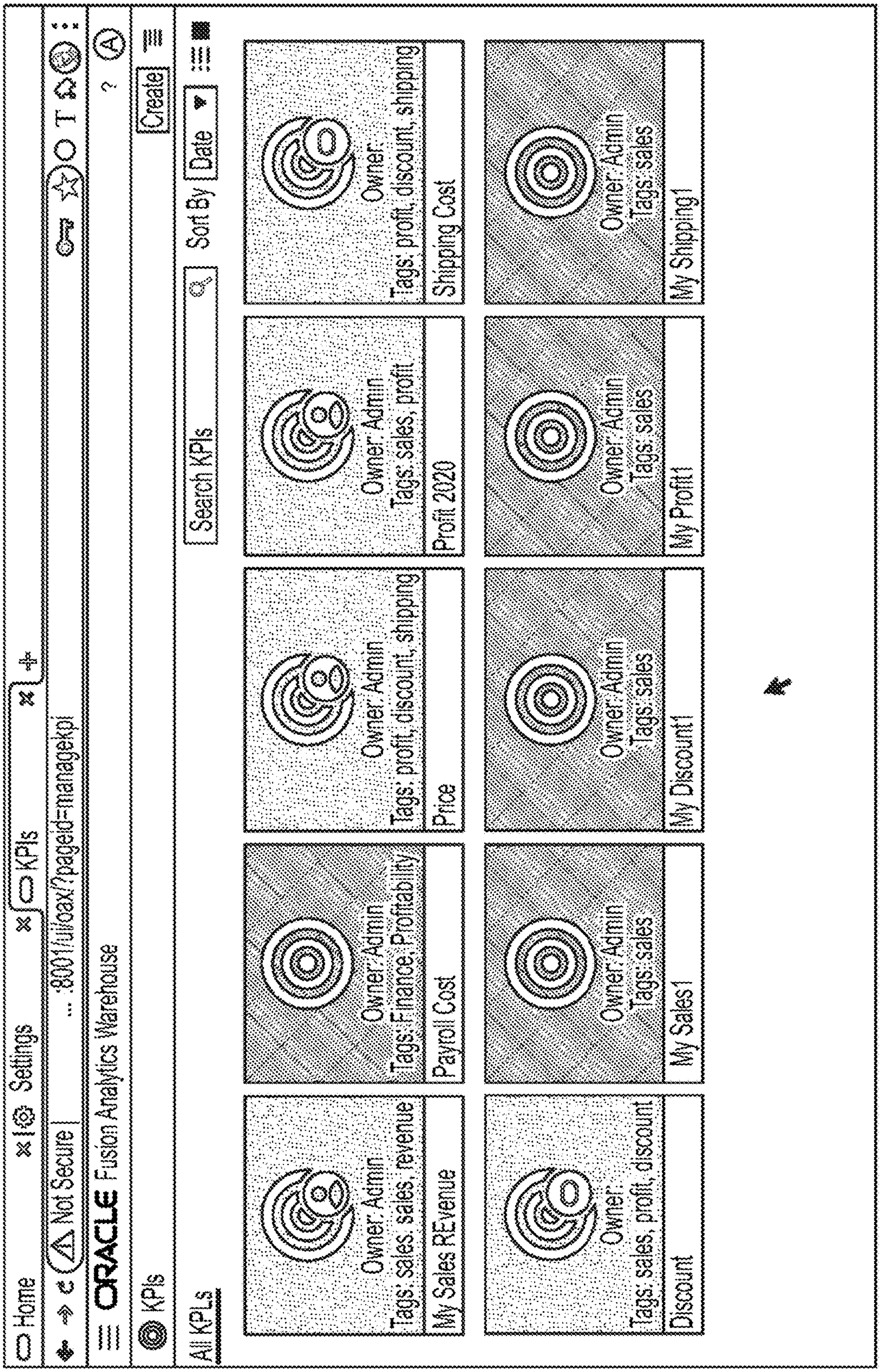
FIG. 19 illustrates an example user interface that enables a user to create and use a customized KPI, in accordance with an embodiment.

As illustrated in FIG. 19, when a KPI is customized, the system changes its icon changes to illustrate it is now a customized KPI. However, the use of a layered customization data model, as described above, allows the customized KPI to retain a lineage to the original, e.g., out-of-the-box or factory-provided KPI, so that improvements, updates, patches or other modifications to the out-of-the-box or factory-provided can also be surfaced within the customized KPI.

For example, as illustrated in FIG. 19, the "Sales" KPI has been modified by the user to be a "My Sales Revenue" KPI, and in this example is now associated with a particular icon that indicates its associated KPI is a customized KPI. In this particular example, the system has also reorganized the KPI's according to date modified.

Figure 20:
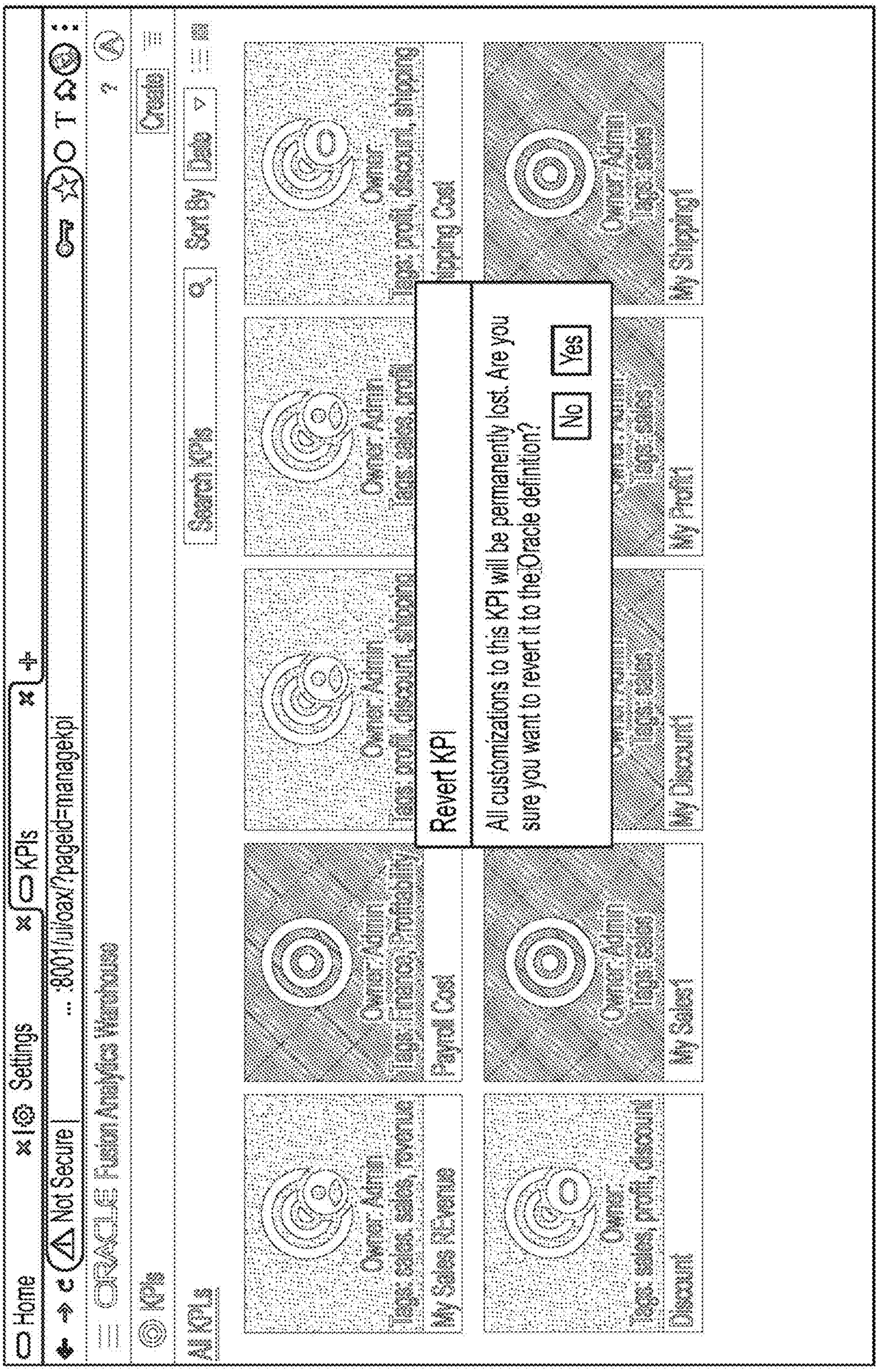
FIG. 20 illustrates an example user interface that enables a user to create and use a customized KPI, in accordance with an embodiment.

As illustrated in FIG. 20, at a subsequent point in time a user can elect to revert the customized KPI back to its, original, e.g., out-of-the-box or factory-provided KPI.

Figure 21:
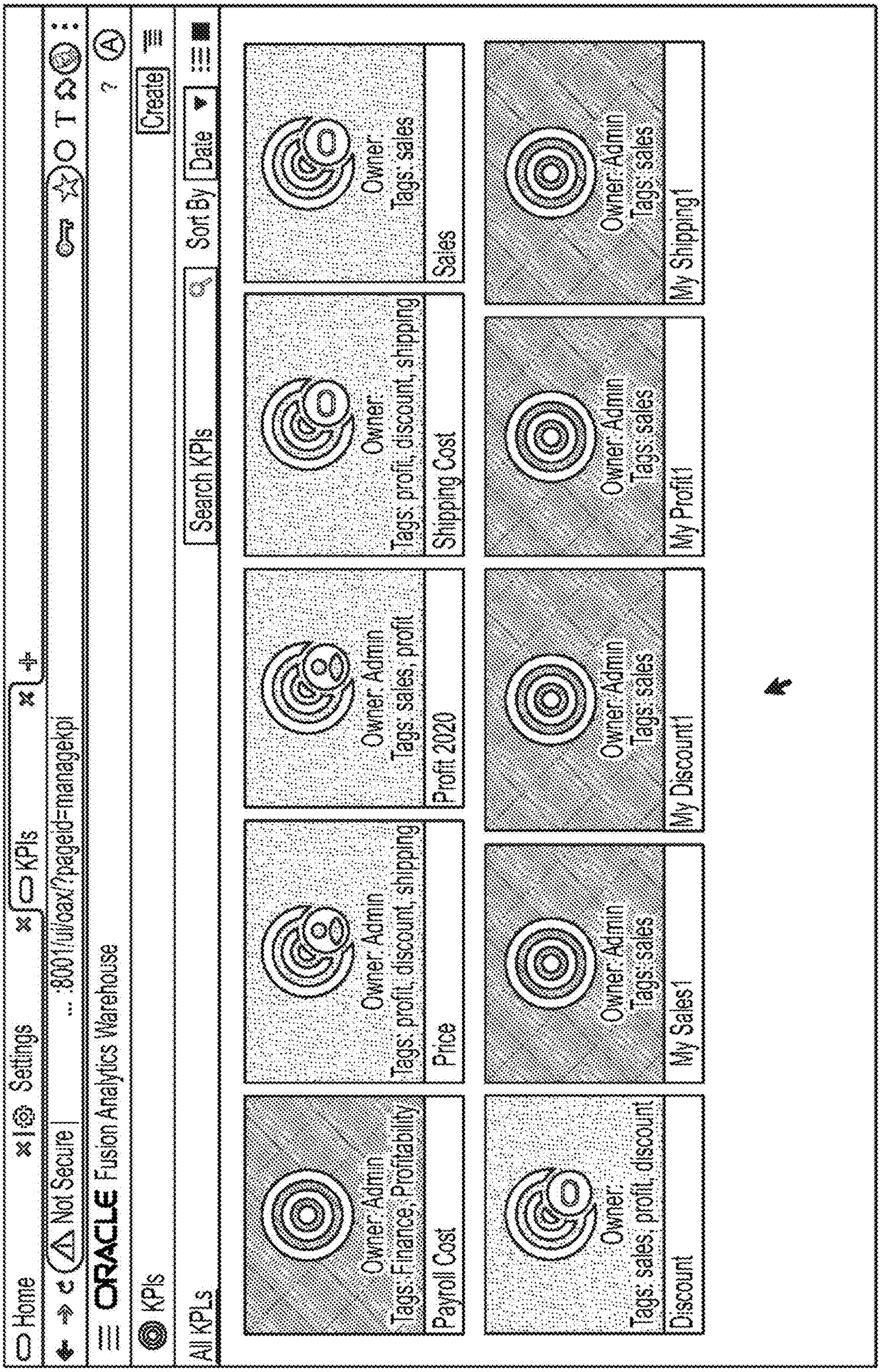
FIG. 21 illustrates an example user interface that enables a user to create and use a customized KPI, in accordance with an embodiment.

As illustrated in FIG. 21, once reverted to its original configuration, the icon associated with that KPI can similarly revert to its original icon. For example, the My Sales Revenue" KPI can be reverted back to the "Sales" KPI, and its associated icon reverted back to indicate its associated KPI is again that of an original (e.g., out-of-the-box or factory) KPI, as originally illustrated in FIG. 14.

Figure 22:
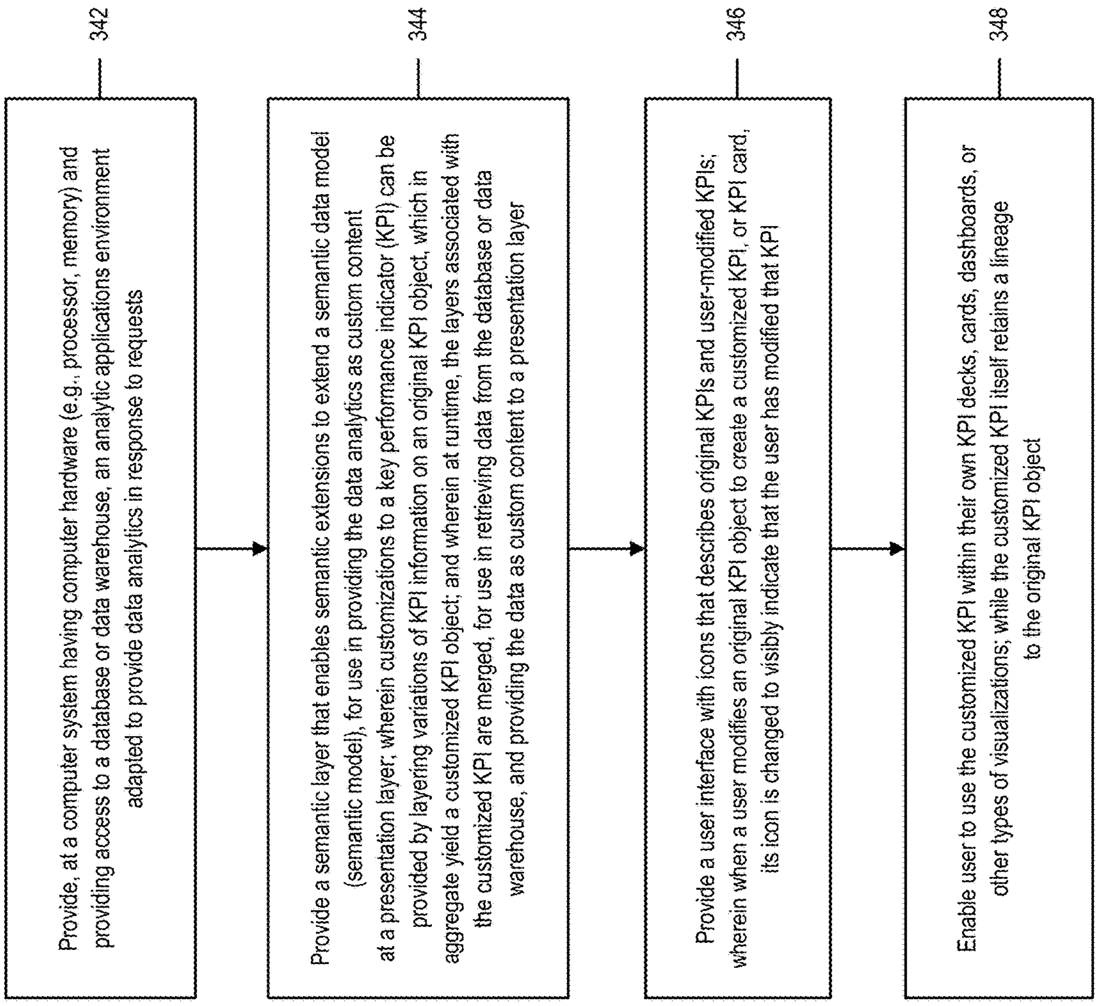
FIG. 22 illustrates a process for providing KPI customization in an analytic applications environment, in accordance with an embodiment.

FIG. 22 illustrates a process for providing KPI customization in an analytic applications environment, in accordance with an embodiment.

As illustrated in FIG. 22, in accordance with an embodiment, at step 342, a computer system having computer hardware (e.g., processor, memory) provides access to a database or data warehouse, via an analytic applications environment adapted to provide data analytics in response to requests.

At step 344, a semantic layer enables semantic extensions to extend a semantic data model (semantic model), for use in providing the data analytics as custom content at a presentation layer; wherein customizations to a key performance indicator (KPI) can be provided by layering variations of KPI information on an original KPI object, which in aggregate yield a customized KPI object; and wherein at runtime, the layers associated with the customized KPI are merged, for use in retrieving data from the database or data warehouse, and providing the data as custom content to a presentation layer.

At step 346, a user interface is provided with icons that describes original KPIs and user-modified KPIs; wherein when a user modifies an original KPI object to create a customized KPI, or KPI card, its icon is changed to visibly indicate that the user has modified that KPI.

At step 348, the system enables a user to use the customized KPI within their own KPI decks, cards, dashboards, or other types of visualizations; while the customized KPI itself retains a lineage to the original KPI object.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing key performance indicator (KPI) customization in an analytic applications environment, including a user interface for modification of key performance indicator objects, comprising:

a computer including one or more processors, that provides access to an analytic applications environment, wherein the analytic applications environment comprises:

a database or data warehouse for storage of data, and a presentation layer that provides access to the data via key performance indicators;

wherein the system enables customization of the key performance indicators associated with the data provided to the presentation layer, including that a customized key performance indicator based on modifications to an original version is generated by layering a key performance indicator object as defined by an original key performance indicator definition, with one or more changes to the key performance indicator object as provided by one or more extensions thereto, wherein the customization to generate the customized key performance indicator is applied at run-time when the original key performance indicator definition and the changes provided by the one or more extensions are merged;

wherein the system is adapted to provide a user interface with a plurality of icons displayed therein that are associated with and are indicative of original key performance indicators and user-modified key performance indicators, wherein when an original key performance indicator object is extended to create a customized key performance indicator, its associated icon as displayed within the user interface is changed to visibly indicate that the key performance indicator has been modified.

2. The system of claim 1, wherein a key performance indicator model is used in association with a presentation layer of a data analytics environment, to prepare user interface decks, cards, dashboards or other visualizations associated with a customer data and maintained within the data analytics environment.

3. The system of claim 1, wherein the system is provided in a cloud or multi-tenant environment, and further comprises:

a semantic layer that operates with the database or data warehouse in providing the data to the presentation layer, wherein the presentation layer generates the key performance indicators;

wherein a first tenant may create a first set of changes to an original version of a key performance indicator object, and wherein the first set of changes are stored as a first delta-KPI; and wherein a second tenant may create a second set of changes to the original version of the key performance indicator object, and wherein the second set of changes are stored as a second delta-KPI.

4. The system of claim 1, wherein the customized key performance indicator is stored in a JSON format which is used to provide the information returned by a database to the user interface, and to indicate when the data associated with a particular key performance indicator is being provided by an original version of a key performance indicator object, or by a customized key performance indicator object, which information is parsed by the presentation layer or user interface when rendering an indication of the key performance indicator including its icon as displayed in the user interface.

5. The system of claim 1, wherein an array of key performance indicators is displayed within the user interface, from which particular key performance indicators are selected for customization and icons provided to indicate which key performance indicators have been customized, wherein at a subsequent point in time a user can elect to revert the customized key performance indicator back to its original key performance indicator, wherein the icon associated with that key performance indicator reverts to its original icon.

6. A method for providing key performance indicator (KPI) customization in an analytic applications environment, including a user interface for modification of key performance indicator objects, comprising:

providing, by a computer including one or more processors, access to an analytic applications environment, wherein the analytic applications environment comprises:

a database or data warehouse for storage of data, and a presentation layer that provides access to the data via key performance indicators;

providing customization of the key performance indicators associated with the data provided to the presentation layer, including that a customized key performance indicator based on modifications to an original version is generated by layering a key performance indicator object as defined by an original key performance indicator definition, with one or more changes to the key performance indicator object as provided by one or more extensions thereto, wherein the customization to generate the customized key performance indicator is applied at run-time when the original key performance indicator definition and the changes provided by the one or more extensions are merged;

wherein the system is adapted to provide a user interface with a plurality of icons displayed therein that are associated with and are indicative of original key performance indicators and user-modified key performance indicators, wherein when an original key performance indicator object is extended to create a customized key performance indicator, its associated icon as displayed within the user interface is changed to visibly indicate that the key performance indicator has been modified.

7. The method of claim 6, wherein a key performance indicator model is used in association with a presentation layer of a data analytics environment, to prepare user interface decks, cards, dashboards or other visualizations associated with a customer data and maintained within the data analytics environment.

8. The method of claim 6, wherein the system is provided in a cloud or multi-tenant environment, and further comprises:

a semantic layer that operates with the database or data warehouse in providing the data to the presentation layer, wherein the presentation layer generates the key performance indicators;

wherein a first tenant may create a first set of changes to an original version of a key performance indicator object, and wherein the first set of changes are stored as a first delta-KPI; and wherein a second tenant may create a second set of changes to the original version of the key performance indicator object, and wherein the second set of changes are stored as a second delta-KPI.

9. The method of claim 6, wherein the customized key performance indicator is stored in a JSON format which is used to provide the information returned by a database to the user interface, and to indicate when the data associated with a particular key performance indicator is being provided by an original version of a key performance indicator object, or by a customized key performance indicator object, which information is parsed by the presentation layer or user interface when rendering an indication of the key performance indicator including its icon as displayed in the user interface.

10. The method of claim 6, wherein an array of key performance indicators is displayed within the user interface, from which particular key performance indicators are selected for customization and icons provided to indicate which key performance indicators have been customized, wherein at a subsequent point in time a user can elect to revert the customized key performance indicator back to its original key performance indicator, wherein the icon associated with that key performance indicator reverts to its original icon.

11. A non-transitory computer readable storage medium having instructions thereon, which when read and executed by a computer including one or more processors cause the computer to perform a method comprising:

providing, by a computer including one or more processors, access to an analytic applications environment, wherein the analytic applications environment comprises:

a database or data warehouse for storage of data, and a presentation layer that provides access to the data via key performance indicators;

providing customization of the key performance indicators associated with the data provided to the presentation layer, including that a customized key performance indicator based on modifications to an original version is generated by layering a key performance indicator object as defined by an original key performance indicator definition, with one or more changes to the key performance indicator object as provided by one or more extensions thereto, wherein the customization to generate the customized key performance indicator is applied at run-time when the original key performance indicator definition and the changes provided by the one or more extensions are merged;

wherein the system is adapted to provide a user interface with a plurality of icons displayed therein that are associated with and are indicative of original key performance indicators and user-modified key performance indicators, wherein when an original key performance indicator object is extended to create a customized key performance indicator, its associated icon as displayed within the user interface is changed to visibly indicate that the key performance indicator has been modified.

12. The non-transitory computer readable storage medium of claim 11, wherein a key performance indicator model is used in association with a presentation layer of a data analytics environment, to prepare user interface decks, cards, dashboards or other visualizations associated with a customer data and maintained within the data analytics environment.

13. The non-transitory computer readable storage medium of claim 11, wherein the system is provided in a cloud or multi-tenant environment, and further comprises:

a semantic layer that operates with the database or data warehouse in providing the data to the presentation layer, wherein the presentation layer generates the key performance indicators;

wherein a first tenant may create a first set of changes to an original version of a key performance indicator object, and wherein the first set of changes are stored as a first delta-KPI; and wherein a second tenant may create a second set of changes to the original version of the key performance indicator object, and wherein the second set of changes are stored as a second delta-KPI.

14. The non-transitory computer readable storage medium of claim 11, wherein the customized key performance indicator is stored in a JSON format which is used to provide the information returned by a database to the user interface, and to indicate when the data associated with a particular key performance indicator is being provided by an original version of a key performance indicator object, or by a customized key performance indicator object, which information is parsed by the presentation layer or user interface when rendering an indication of the key performance indicator including its icon as displayed in the user interface.

15. The non-transitory computer readable storage medium of claim 11, wherein an array of key performance indicators is displayed within the user interface, from which particular key performance indicators are selected for customization and icons provided to indicate which key performance indicators have been customized, wherein at a subsequent point in time a user can elect to revert the customized key performance indicator back to its original key performance indicator, wherein the icon associated with that key performance indicator reverts to its original icon.

* * * * *

UNITED STATES PATENT AND TRADEMARK OFFICE

CERTIFICATE OF CORRECTION

PATENT NO. : 11,741,415 B2
APPLICATION NO. : 17/476246
DATED : August 29, 2023
INVENTOR(S) : Granholm et al.

It is certified that error appears in the above-identified patent and that said Letters Patent is hereby corrected as shown below:

On the Title Page

On page 2, Column 2, under Other Publications, Line 10, delete "PCT/U.S. Pat. No. 20217051587" and insert -- PCT/US2021/051587 --, therefor.

In the Specification

In Column 4, Line 45, delete "organization," and insert -- organization. --, therefor.

In Column 17, Line 56 (Approx.), delete "a an" and insert -- an --, therefor.

In Column 20, Line 45, delete "a an" and insert -- an --, therefor.

Signed and Sealed this
Eighteenth Day of June, 2024

Katherine Kelly Vidal

Katherine Kelly Vidal
*Director of the United States Patent and Trademark Office*